United States Patent
Nagata

(10) Patent No.: US 10,225,702 B2
(45) Date of Patent: Mar. 5, 2019

(54) COMMUNICATION SYSTEM, AND HOT-WIRE SENSOR TERMINAL USED THEREIN

(71) Applicant: PANASONIC INTELLECTUAL PROPERTY MANAGEMENT CO., LTD., Osaka (JP)

(72) Inventor: Masahiro Nagata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 486 days.

(21) Appl. No.: 15/104,169

(22) PCT Filed: Dec. 5, 2014

(86) PCT No.: PCT/JP2014/006087
§ 371 (c)(1),
(2) Date: Jun. 13, 2016

(87) PCT Pub. No.: WO2015/087525
PCT Pub. Date: Jun. 18, 2015

(65) Prior Publication Data
US 2016/0316350 A1    Oct. 27, 2016

(30) Foreign Application Priority Data
Dec. 13, 2013  (JP) .................... 2013-258412

(51) Int. Cl.
H04W 4/20        (2018.01)
H04W 4/80        (2018.01)
(Continued)

(52) U.S. Cl.
CPC .............. *H04W 4/20* (2013.01); *H04W 4/80* (2018.02); *H04W 52/0216* (2013.01);
(Continued)

(58) Field of Classification Search
CPC .. Y02B 20/48; H05B 37/029; H05B 33/0854; H05B 37/0272; F21Y 2115/10
See application file for complete search history.

(56) References Cited

U.S. PATENT DOCUMENTS

2006/0128415 A1   6/2006  Horikishi et al.
2010/0278087 A1   11/2010 Kawakami et al.
(Continued)

FOREIGN PATENT DOCUMENTS

JP   2006-166242 A   6/2006
JP   2008-048365 A   2/2008
(Continued)

OTHER PUBLICATIONS

International Search Report and Written Opinion issued in corresponding International Patent Application No. PCT/JP2014/006087, dated Mar. 10, 2015; with partial English translation.

*Primary Examiner* — Jung H Park
(74) *Attorney, Agent, or Firm* — McDermott Will & Emery LLP

(57) ABSTRACT

The slave starts a continuously receiving operation after activated. When failing to receive a beacon signal in the continuously receiving operation, the slave establishes communication using a communication frame including a downstream slot managed by the slave so as to perform an intermittently receiving operation using the downstream slot at an intermittently receiving cycle equal to an integral multiple of one cycle of the communication frame. The master sends successive activation signals after activated, and subsequently sends the beacon signal. When receiving at least one of the successive activation signals in the intermittently receiving operation, the slave starts the receiving operation.

13 Claims, 16 Drawing Sheets

(51) Int. Cl.
*H04W 52/02* (2009.01)
*H04W 56/00* (2009.01)

(52) U.S. Cl.
CPC ......... *H04W 56/00* (2013.01); *H04W 56/001* (2013.01); *H04W 52/0245* (2013.01); *Y02D 70/00* (2018.01)

(56) References Cited

U.S. PATENT DOCUMENTS

| | | |
|---|---|---|
| 2012/0243454 A1 | 9/2012 | Hwang et al. |
| 2013/0240235 A1* | 9/2013 | Higashihama ........... H01H 9/02 174/53 |
| 2014/0368116 A1* | 12/2014 | Walters .............. H05B 37/0272 315/152 |
| 2015/0249546 A1* | 9/2015 | Zheng ................... H04L 47/621 370/442 |

FOREIGN PATENT DOCUMENTS

| | | |
|---|---|---|
| JP | 2009-135708 A | 6/2009 |
| JP | 2011-061571 A | 3/2011 |
| JP | 2011-101276 A | 5/2011 |

\* cited by examiner

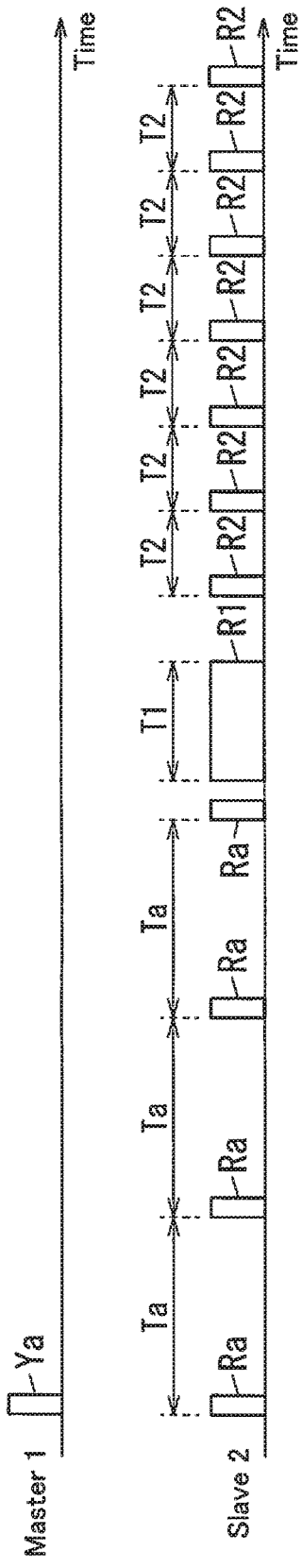
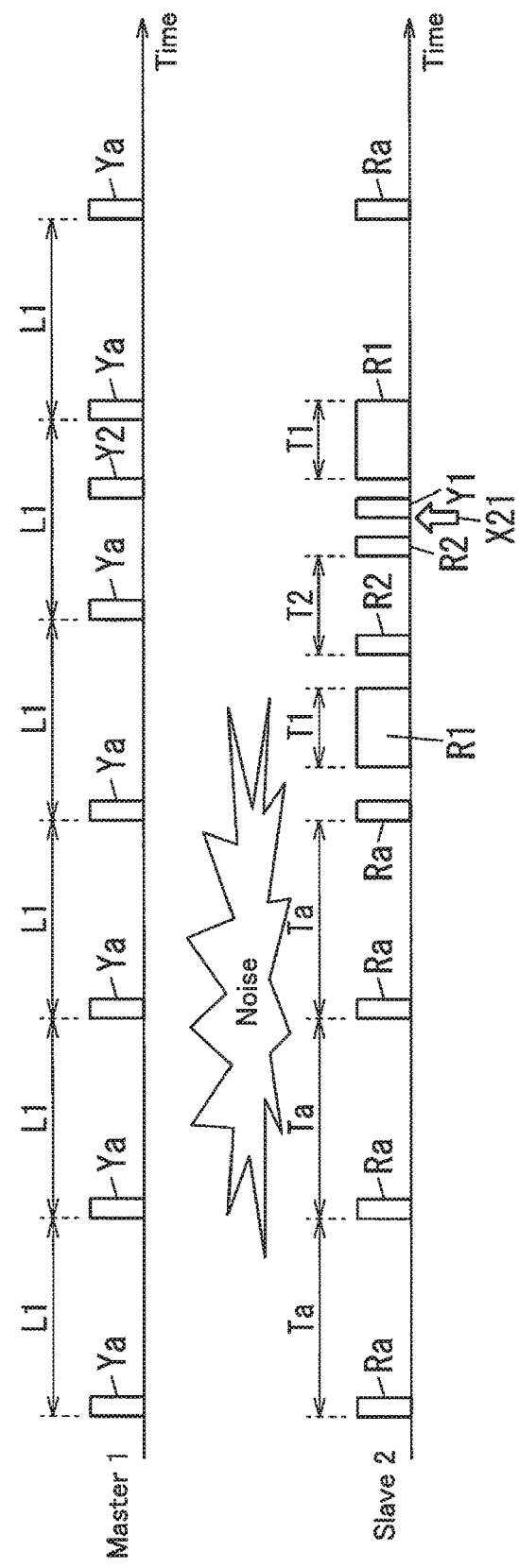
FIG. 15
FIG. 16

COMMUNICATION SYSTEM, AND HOT-WIRE SENSOR TERMINAL USED THEREIN

RELATED APPLICATIONS

This application is the U.S. National Phase under 35 U.S.C. § 371 of International Patent Application No. PCT/JP2014/006087, filed on Dec. 5, 2014, which in turn claims the benefit of Japanese Application No. 2013-258412, filed on Dec. 13, 2013, the disclosures of which Applications are incorporated by reference herein.

TECHNICAL FIELD

The present invention generally relates to communication systems and hot-wire sensor terminals used therein, and particularly to a communication system performing wireless communication based on communication frames and a hot-wire sensor terminal used therein.

BACKGROUND ART

In the past, there have been proposed communication systems in which masters serving as coordinators and slaves serving as end devices perform wireless communication with each other. In these communication systems, a communication frame F100 including a beacon signal as its head (shown in FIG. 22).

The communication frame F100 defines virtual communication time slots defined by thirty-one time slots. Thus, each communication terminal on a network is allowed to send and receive signals at a predetermined timing rather than any timing. The thirty-one time slots are one beacon slot TS101 provided as a head of the communication frame F100, and thirty data slots TS102 provided subsequent to the beacon slot TS101. The beacon slot TS101 is a time slot for sending the beacon signal in a downstream direction from the master to the slave. The beacon signal is used for making communication synchronization between the master and the slave. Each data time slot TS102 is a time slot for sending a signal in an upstream direction from the slave to the master. When receiving an upstream signal in a time slot, the master sends a downstream signal in the same time slot, if necessary.

The master sends the beacon signal by use of the beacon slot TS101. The slave makes synchronization with the master based on a time point of receiving the beacon signal, thereby communicating with the master by use of the data slot TS102 of the communication frame F100.

Next, an operation in a case where the master is activated prior to the slave is described. The master activated earlier sends the beacon signal intermittently. The slave activated later performs a continuous receiving of continuing a receiving operation throughout a certain time period, initially. The time period for the continuous receiving is set to be longer than one cycle of the communication frame F100 (i.e., a cycle of sending the beacon signal). Therefore, when the slave is activated with the master being already in operation, the slave can receive the beacon signal sent from the master.

Next, an operation in a case where the slave is activated prior to the master is described. At a time point of activating the slave, the master is not activated yet, and therefore the master does not send the beacon signal. When failing to receive the beacon signal, the slave performs an intermittently receiving operation at an intermittently receiving interval based on time measured by a clock built in the slave. When activated, the master sends an activation signal. A time period for sending the activation signal is set to be longer than the intermittently receiving interval, and thus the slave can receive the activation signal. When receiving the activation signal, the slave extends the receiving operation to receive the beacon signal which is sent from the master subsequent to the activation signal (e.g., see JP 2011-101276 A). Accordingly, even if the slave is activated in a situation where the master is not activated yet, the slave can receive the beacon signal to make the synchronization, and therefore can establish communication by use of the communication frame F100.

According to the above background art, in a case where the slave is activated prior to the master, the slave fails to receive the beacon signal immediately after activation. Thus, the slave performs the intermittently receiving operation at the intermittently receiving interval based on the time measured by the clock built in the slave. When succeeding in receiving the beacon signal, the slave establishes communication by use of the communication frame F100. However, there is a great difference in the communication scheme between the aforementioned intermittently receiving operation without using the communication frame and the communication by use of the communication frame. Accordingly, the slave is required to conform with such two greatly different communication schemes, and this may lead to an increase in a load necessary for a communication process.

SUMMARY OF INVENTION

In view of the above insufficiency, an objective of the present invention would be to propose a communication system capable of allowing a slave to receive a beacon signal to thereby make synchronization with a master irrespective of an activation order of the master and the slave, and also capable of reducing a load necessary for the slave to perform a communication process, and a hot-wire sensor terminal used therein.

The communication system of one aspect of the present invention includes: a slave; and one or multiple masters configured to establish wireless communication with the slave. The one or multiple masters and the slave are configured to communicate with each other by use of a communication frame including a first time slot allowing the one or multiple masters to send a beacon signal to the slave and a second time slot allowing the slave to perform a receiving operation only. The slave is configured to, when activated, start a first receiving operation of performing the receiving operation throughout a first time period longer than one cycle of the communication frame. The slave is configured to, when receiving the beacon signal while performing the first receiving operation, perform, by use of the communication frame, synchronous communication of making synchronization with the one or multiple masters based on a time point of receiving the beacon signal, and communicating with the one or multiple masters. The slave is configured to, when failing to receive the beacon signal while performing the first receiving operation, perform, by use of the communication frame, asynchronous communication of communicating with the one or multiple masters without making the synchronization to perform a second receiving operation using the second time slot at an intermittently receiving cycle being an integral multiple of one cycle of the communication frame. The one or multiple masters are configured to, when activated, send successive activation signals in a second time period longer than the intermittently receiving cycle, and subsequently send the beacon signal.

The slave is configured to, when receiving at least one of the successive activation signals while being in the second receiving operation, start a third receiving operation.

The hot-wire sensor terminal of one aspect of the present invention is a hot-wire sensor terminal serving as the slave of the communication system of one aspect of the present invention. The hot-wire sensor terminal includes: a detection circuit configured to detect hot-wire to be radiated from a human body; a control circuit configured to determine whether the human body has been detected, based on a detection result of the detection circuit; and a wireless communication circuit configured to perform wireless communication with the one or multiple masters of the communication system and configured to send a detection signal when the control circuit determines that the human body has been detected.

The aspects of the present invention offer advantageous effects of allowing the slave to receive the beacon signal to make the synchronization with the master irrespective of the activation order of the master and the slave and of reducing the load necessary for the communication process.

BRIEF DESCRIPTION OF DRAWINGS

FIG. 15 is a sequence diagram of an operation of Embodiment 1 in a case where the beacon signal is missing.

FIG. 16 is another sequence diagram of an operation of Embodiment 1 in a case where the beacon signal is missing.

DESCRIPTION OF EMBODIMENTS

Hereinafter, some of embodiments of the present invention are described with reference to the drawings.

Embodiment 1

Figure 1:
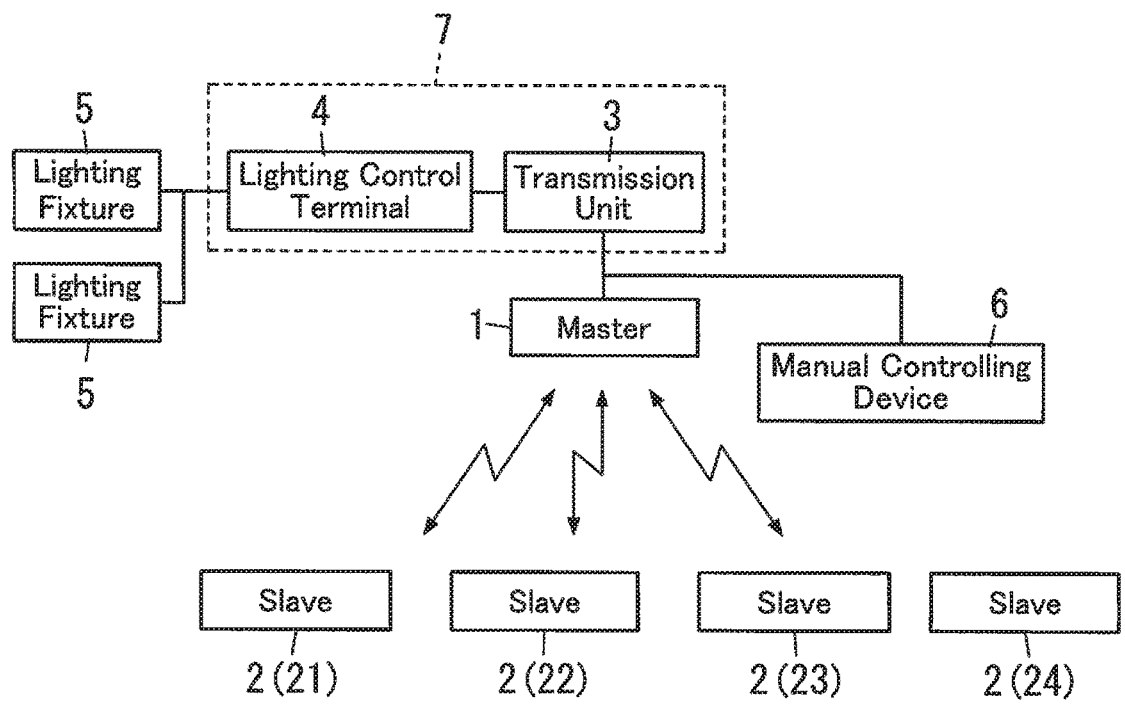
FIG. 1 is a schematic diagram of a whole configuration of a communication system of Embodiment 1.

FIG. 1 shows a configuration of a communication system of the present embodiment. As shown in FIG. 1, the communication system includes a master 1, multiple slaves 2, a transmission unit 3, a lighting control terminal 4, lighting fixtures 5, and a manual controlling device 6.

Figure 2:
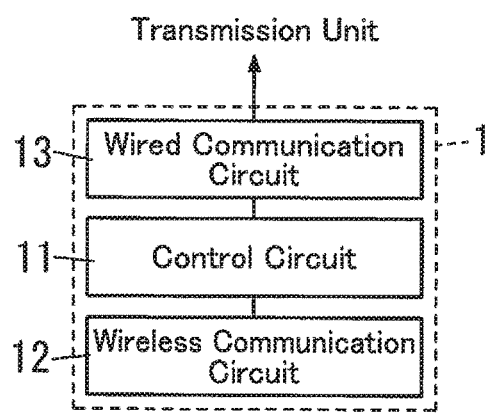
FIG. 2 is a block diagram of a configuration of a master of Embodiment 1.

As shown in FIG. 2, the master 1 includes a control circuit 11, a wireless communication circuit 12, and a wired communication circuit 13. The wireless communication circuit 12 is configured to perform wireless communication with the slaves 2. The wired communication circuit 13 is configured to perform wired communication with the transmission unit 3. The control circuit 11 is configured to control operations of the wireless communication circuit 12 and the wired communication circuit 13. The master 1 is supplied with operating power through a communication line from the transmission unit 3. The transmission unit 3 is configured to generate the operating power from power supplied from a commercial power supply, for example. Hence, the master 1 can be considered a communication device operating with power from the commercial power supply.

Figure 12:
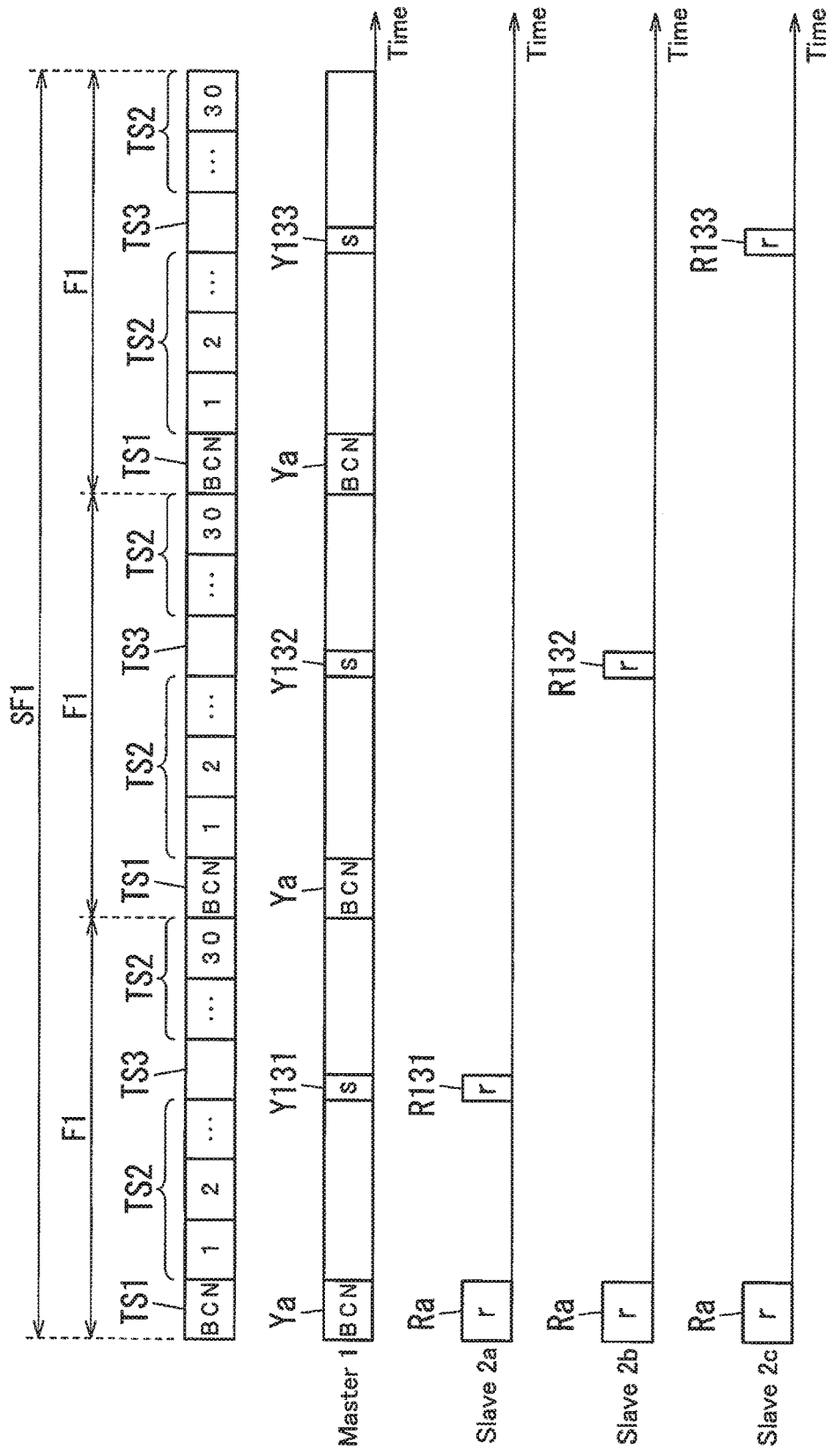
FIG. 12 is a sequence diagram of communication based on super frames between the master and the slaves of Embodiment 1.

The slave 2 is configured to function as a wireless switch, a wireless sensor, and the like. The slave 2 is configured to send various condition signals (transmission signals) to the master 1. The slave 2 includes a battery therein, and is supplied with operating power from the battery. The slave 2 may be selected from a group including a switch terminal 21, a hot-wire sensor terminal 22, an illuminance sensor terminal 23, and a temperature and humidity sensor terminal 24. Note that, when there is no need to distinguish the switch terminal 21, the hot-wire sensor terminal 22, the illuminance sensor terminal 23, and the temperature and humidity sensor terminal 24 from each other, they are referred to as simply the slaves 2. Note that, when there is need to distinguish the multiple slaves 2 irrespective of their functions, they are distinguished from each other by use of reference signs 2a, 2b, 2c, . . . , (as shown in FIG. 12).

Figure 3:
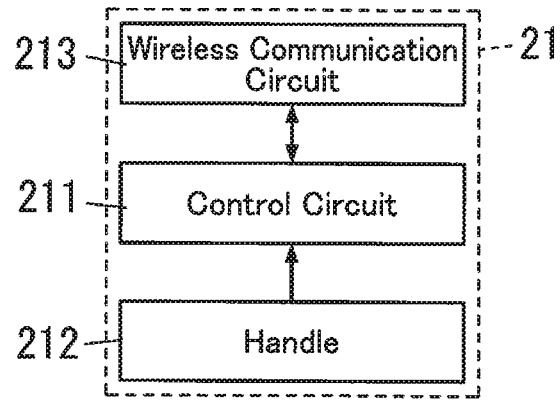
FIG. 3 is a block diagram of a configuration of a switch terminal of Embodiment 1.

As shown in FIG. 3, the switch terminal 21 includes a control circuit 211, a handle 212, and a wireless communication circuit 213. The handle 212 serves as manual operating means allowing a user to turn it to on and off positions. The wireless communication circuit 213 is configured to perform wireless communication with the master 1. The control circuit 211 is configured to send an on operation signal or an off operation signal through the wireless communication circuit 213, according to manual operation of the handle 212.

Figure 4:
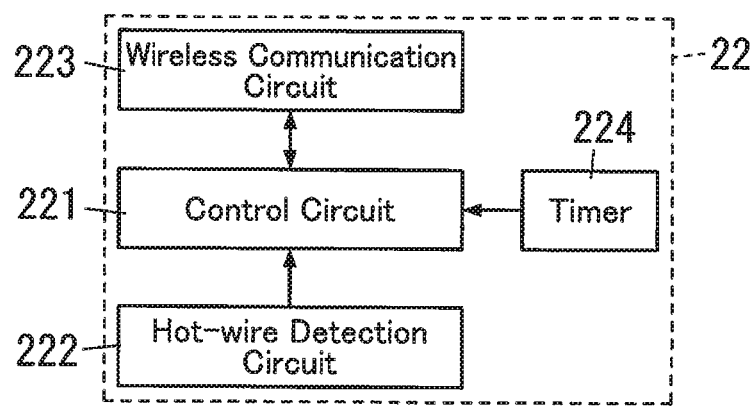
FIG. 4 is a block diagram of a configuration of a hot-wire sensor terminal of Embodiment 1.

As shown in FIG. 4, the hot-wire sensor terminal 22 includes a control circuit 221, a hot-wire detection circuit 222, a wireless communication circuit 223, and a timer 224. The hot-wire detection circuit 222 includes a hot-wire detection element and is configured to detect hot-wire (infrared) to be radiated from a human body. The wireless communication circuit 223 is configured to perform wireless communication with the master 1. The timer 224 is configured to, when the control circuit 221 determines that a human body has been detected, start to measure a holding time. The timer 224 is configured to, when the control circuit 221 again determines that a human body has been detected while the timer 224 measures the holding time, restart to measure the holding time after resetting a measured value of the holding time. The control circuit 221 is configured to determine whether the human body has been detected, based on a detection result of the hot-wire detection circuit 222. The control circuit 221 is configured to, when determining that the human body has been detected, send a human detection signal through the wireless communication circuit 223. Further, the control circuit 221 is configured to, when the timer 224 completes measurement of the holding time (the time is up), send a time up signal through the wireless communication circuit 223.

Figure 5:
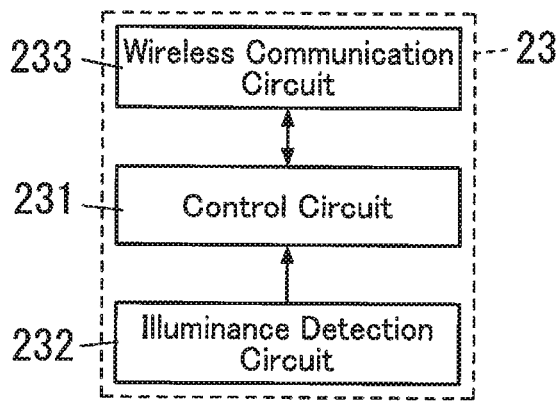
FIG. 5 is a block diagram of a configuration of an illuminance sensor terminal of Embodiment 1.

As shown in FIG. 5, the illuminance sensor terminal 23 includes a control circuit 231, an illuminance detection circuit 232, and a wireless communication circuit 233. The illuminance detection circuit 232 includes an illuminance detection element, and is configured to detect an illuminance in a lighting space of the lighting fixture 5. The wireless communication circuit 233 is configured to perform wireless communication with the master 1. The control circuit 231 is configured to send, through the wireless communication circuit 233, an illuminance signal indicative of a detection result of the illuminance given by the illuminance detection circuit 232.

Figure 6:
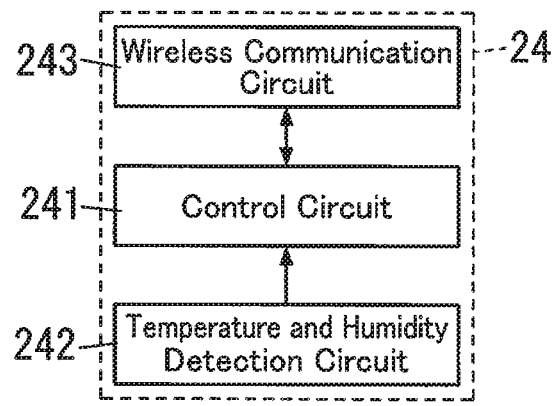
FIG. 6 is a block diagram of a configuration of a temperature and humidity sensor terminal of Embodiment 1.

As shown in FIG. 6, the temperature and humidity sensor terminal 24 includes a control circuit 241, a temperature and humidity detection circuit 242, and a wireless communication circuit 243. The temperature and humidity detection circuit 242 includes a temperature detection element and a humidity detection element, and is configured to measure a temperature and a humidity of the lighting space of the lighting fixture 5. The wireless communication circuit 243 is configured to perform wireless communication with the master 1. The control circuit 241 is configured to send, through the wireless communication circuit 243, a temperature and humidity signal indicative of detection results of the temperature and the humidity given by the temperature and humidity detection circuit 242.

In the master 1, the wireless communication circuit 12 is configured to receive the condition signals (e.g., the on operation signal, the off operation signal, the human detection signal, the time up signal, the illuminance signal, and the temperature and humidity signal) to be sent from the slaves 2. The control circuit 11 is configured to instruct the wired communication circuit 13 to send the received condition signals to the transmission unit 3.

Figure 7:
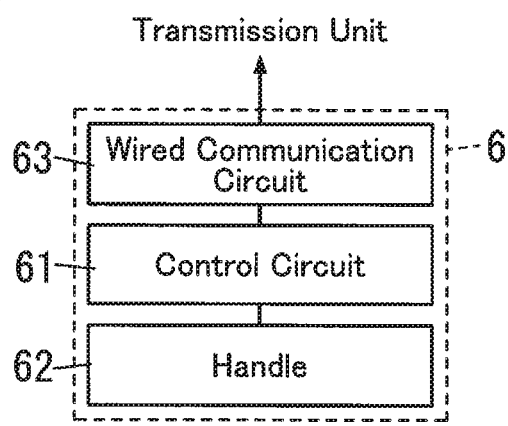
FIG. 7 is a block diagram of a configuration of a manual controlling device of Embodiment 1.

As shown in FIG. 7, the manual controlling device 6 includes a control circuit 61, a handle 62, and a wired communication circuit 63. The handle 62 serves as manual operating means allowing a user to turn it to on and off positions. The wired communication circuit 63 is configured to perform wired communication with the master 1 and the transmission unit 3. The control circuit 61 is configured to send an on operation signal or an off operation signal through the wireless communication circuit 63, according to manual operation of the handle 62.

The transmission unit 3 is configured to perform wired communication with the master 1, the lighting control terminal 4, and the manual controlling device 6. The transmission unit 3 is configured to instruct the lighting control terminal 4 to control the lighting fixture 5, based on at least one of the condition signals received from the master 1 and the manual controlling device 6. The lighting control terminal 4 is configured to control (e.g., turn on and off) the lighting fixture 5 based on instructions from the transmission unit 3.

Further, the lighting control terminal 4 is configured to send a monitoring result (monitoring signal) of a state (e.g., an on state and an off state) of the lighting fixture 5 to the transmission unit 3. The transmission unit 3 is configured to send the monitoring signal to the master 1 and the manual controlling device 6. The transmission unit 3 and the lighting control terminal 4 are placed inside a distribution panel 7 installed in a building where the lighting fixture 5 is installed. Note that, the lighting control terminal 4 may be placed outside the distribution panel 7.

In the master 1, the wired communication circuit 13 is configured to receive the monitoring signal sent from the transmission unit 3. The control circuit 11 is configured to instruct the wireless communication circuit 12 to send the received monitoring signal to the switch terminal 21. In the switch terminal 21, the wireless communication circuit 213 is configured to receive the monitoring signal. The control circuit 211 is configured to select a visual condition of an LED or the like of the master (e.g., the LED being on, the LED being off, and a light emission color) according to the state of the lighting fixture 5.

In the manual controlling device 6, the wired communication circuit 63 is configured to receive the monitoring signal sent from the transmission unit 3. The control circuit 61 is configured to select a visual condition of an LED or the like of the manual controlling device (e.g., the LED being on, the LED being off, and a light emission color) according to the state of the lighting fixture 5.

Hereinafter, a wireless communication system constituted by one or more masters 1 and one or more slaves 2 is described.

Communication between the master 1 and the slave 2 is performed by use of a communication frame F1.

Figure 8:
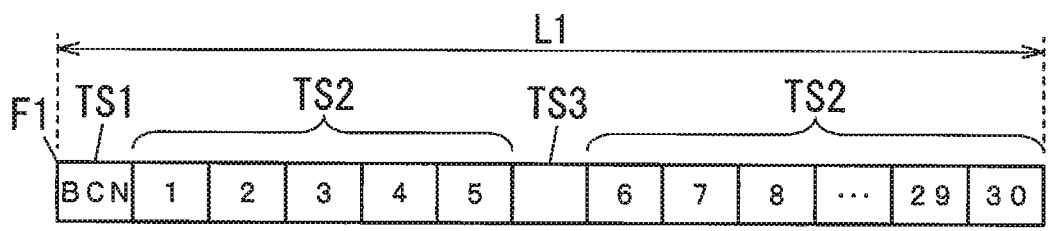
FIG. 8 is a schematic diagram of a format of a first communication frame of Embodiment 1.

As shown in FIG. 8, the communication frame F1 defines virtual communication time slots defined by thirty-two time slots. Thus, each communication terminal on a network is allowed to send and receive signals at a predetermined timing rather than any timing. The thirty-two time slots are one beacon slot TS1 (first time slot), thirty upstream slots TS2, and one downstream slot TS3 (second time slot).

The beacon slot TS1 is positioned on a head of the communication frame F1. The beacon slot TS1 is a time slot for sending a beacon signal (BCN) in a downstream direction from the master 1 to the slave 2. The beacon signal is used for communication synchronization of the master 1 and the slave 2.

The upstream slots TS2 are provided subsequent to the beacon slot TS1. Each upstream slot TS2 is a time slot for sending a signal in an upstream direction from the slave 2 to the master 1. When receiving an upstream signal in a time slot, the master 1 sends a downstream signal in the same time slot, if necessary. Note that, the n-th upstream slot TS2 is represented as TS2(n).

The downstream slot TS3 is provided between the upstream slot TS2(5) and the upstream slot TS2(6). The downstream slot TS3 is a time slot for sending a signal in the downstream direction from the master 1 to the slave 2. In other words, the downstream slot TS3 is a time slot for allowing the slave 2 to perform receiving operation only.

The master 1 sends the beacon signal in the beacon slot TS1. The slave 2 makes synchronization with the master based on a time point of receiving the beacon signal, and performs synchronization communication of communicating with the master 1 by use of the communication frame F1. The master 1 performs receiving operation of receiving a signal from the slave 2 in the upstream slot TS2, and sends a signal as a reply to the slave 2 if necessary. Further, the master 1 performs sending operation of sending a signal to the slave 2 in the downstream slot TS3. In contrast, the slave 2 performs sending operation of sending a signal to the master 1 in the upstream slot TS2, and performs receiving operation of receiving a signal from the master 1 in the downstream slot TS3.

Note that, a length of time of one cycle of the communication frame F1 is referred to as a frame cycle L1. The frame cycle L1 may be set to 1.4 seconds, for example. The frame cycle L1 is equal to a beacon cycle which defines a cycle of appearance of the beacon slot TS1 (cycle of sending the beacon signal).

The master 1 sends the beacon signal Ya in the beacon slot TS1 at the frame cycle L1. In contrast, in the time period of the synchronous communication, the slave 2 performs a beacon receiving operation Ra in the beacon slot TS1 at an integral multiple (e.g., single, double, and triple) of the frame cycle L1. Further, the slave 2 receives the beacon signal Ya through the beacon receiving operation Ra and then corrects the synchronization. The cycle at which the slave 2 performs the beacon receiving operation Ra in the beacon slot TS1 is referred to as a beacon receiving cycle Ta (=integral multiple of the frame cycle L1).

Figure 9:
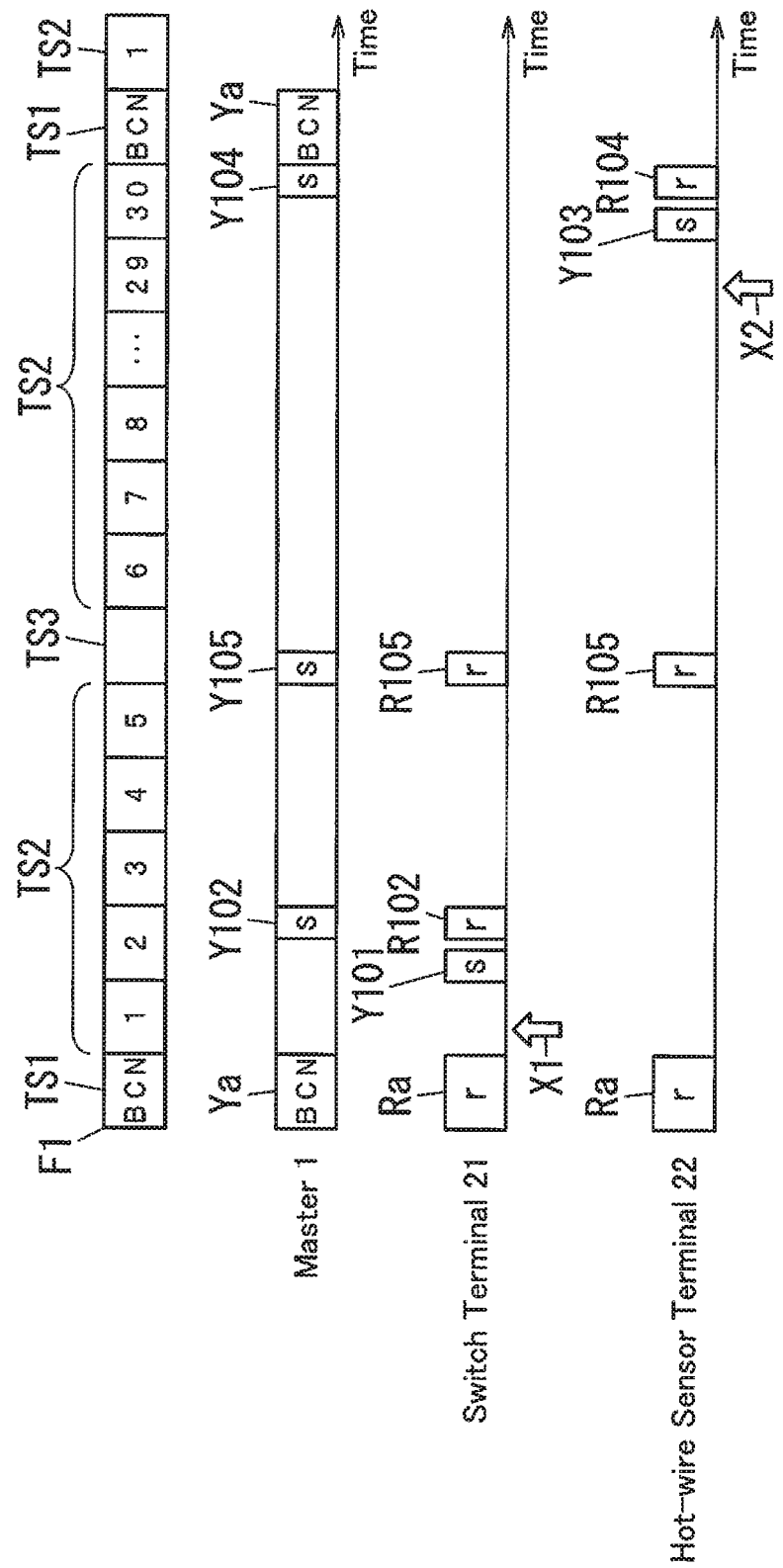
FIG. 9 is a sequence diagram of communication between the master and the slave of Embodiment 1.

FIG. 9 shows the synchronous communication established between the master 1 and the slave 2 using the communication frame F1. The slaves 2 are the switch terminal 21 and the hot-wire sensor terminal 22. Note that, in FIG. 9, "s" means sending, and "r" means receiving.

First, the master 1 sends the beacon signal Ya in the beacon slot TS1. The switch terminal 21 and the hot-wire sensor terminal 22 perform the beacon receiving operation Ra in the beacon slot TS1 to thereby receive the beacon signal Ya and then correct the synchronization.

When the handle 212 of the switch terminal 21 is turned to the on position (X1: occurrence of events), the switch terminal 21 sends the on operation signal Y101 to the master 1 in the upstream slot TS2(2) subsequent to the occurrence of events. When receiving the on operation signal Y101, the master 1 sends a response signal Y102 (ACK signal) to the switch terminal 21 in the upstream slot TS2(2). The switch terminal 21 receives the response signal Y102 in the upstream slot TS2(2) (R102).

When the hot-wire sensor terminal 22 detects a human body (X2: occurrence of events), the hot-wire sensor terminal 22 sends the human detection signal Y103 to the master 1 in the upstream slot TS2(30) subsequent to the occurrence of events. When receiving the human detection signal Y103, the master 1 sends a response signal Y104 to the hot-wire sensor terminal 22 in the upstream slot TS2(30). The hot-wire sensor terminal 22 receives the response signal Y104 in the upstream slot TS2(30) (R104).

When there is information to be sent to the switch terminal 21 and the hot-wire sensor terminal 22, the master 1 sends an information signal Y105 in the downstream slot TS3. The switch terminal 21 and the hot-wire sensor terminal 22 receive the information signal Y105 in the downstream slot TS3 (R105).

Figure 10:
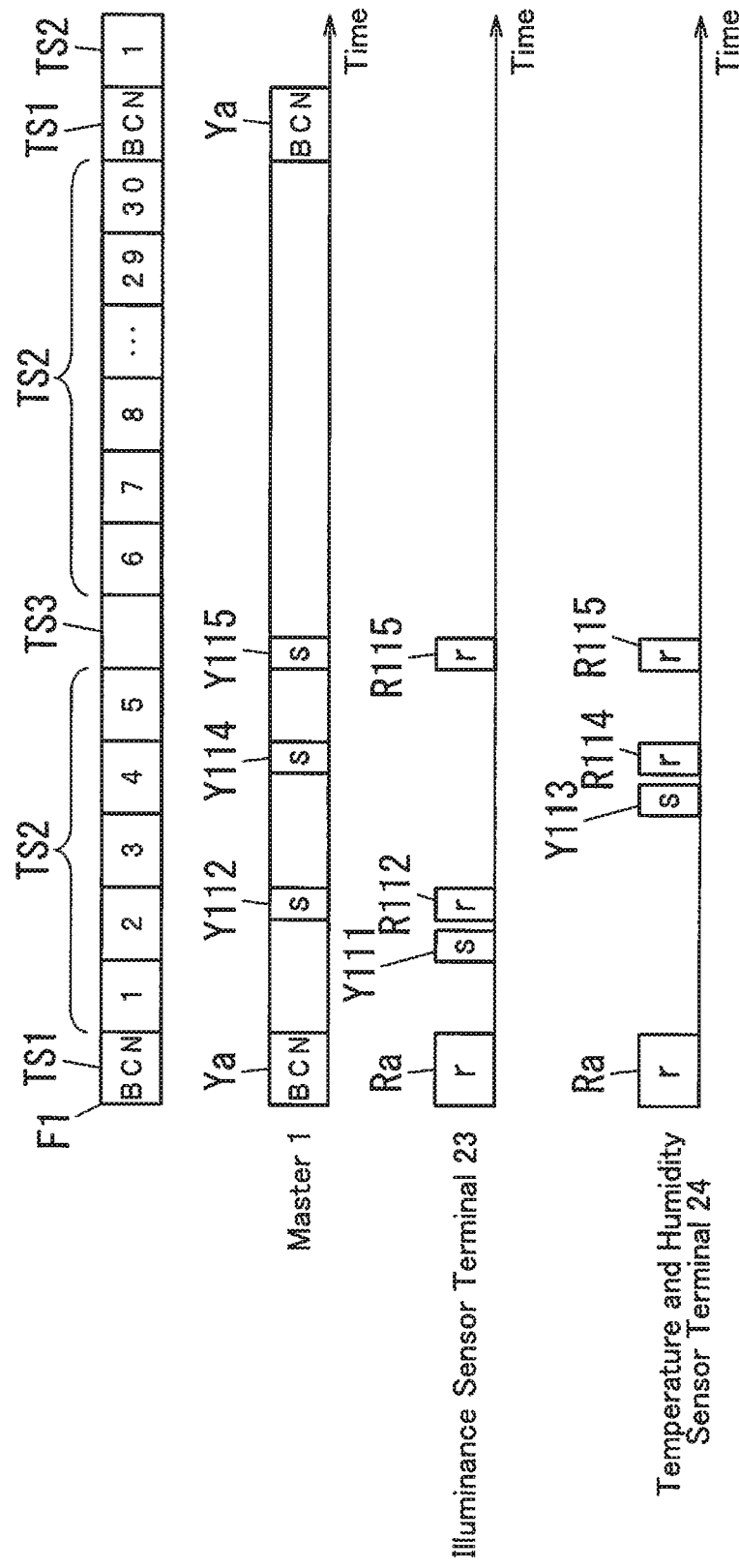
FIG. 10 is another sequence diagram of communication between the master and the slave of Embodiment 1.

FIG. 10 shows the synchronous communication established between the master 1 and the slave 2 using the communication frame F1. The slaves 2 are the illuminance sensor terminal 23 and the temperature and humidity sensor terminal 24. Note that, in FIG. 10, "s" means sending, and "r" means receiving.

First, the master 1 sends the beacon signal Ya in the beacon slot TS1. The illuminance sensor terminal 23 and the temperature and humidity sensor terminal 24 perform the beacon receiving operation Ra in the beacon slot TS1 to thereby receive the beacon signal Ya and then correct the synchronization.

The illuminance sensor terminal 23 and the temperature and humidity sensor terminal 24 perform a sending process periodically.

The illuminance sensor terminal 23 sends the illuminance signal Y111 to the master 1 in the upstream slot TS2(2). When receiving the illuminance signal Y111, the master 1 sends a response signal Y112 to the illuminance sensor terminal 23 in the upstream slot TS2(2). The illuminance sensor terminal 23 receives the response signal Y112 in the upstream slot TS2(2) (R112).

The temperature and humidity sensor terminal 24 sends the temperature and humidity signal Y113 to the master 1 in the upstream slot TS2(4). When receiving the temperature and humidity signal Y113, the master 1 sends a response signal Y114 to the temperature and humidity sensor terminal 24 in the upstream slot TS2(4). The temperature and humidity sensor terminal 24 receives the response signal Y114 in the upstream slot TS2(4) (R114).

When there is information to be sent to the illuminance sensor terminal 23 and the temperature and humidity sensor terminal 24, the master 1 sends an information signal Y115 in the downstream slot TS3. The illuminance sensor terminal 23 and the temperature and humidity sensor terminal 24 receive the information signal Y115 in the downstream slot TS3 (R115).

Figure 11:
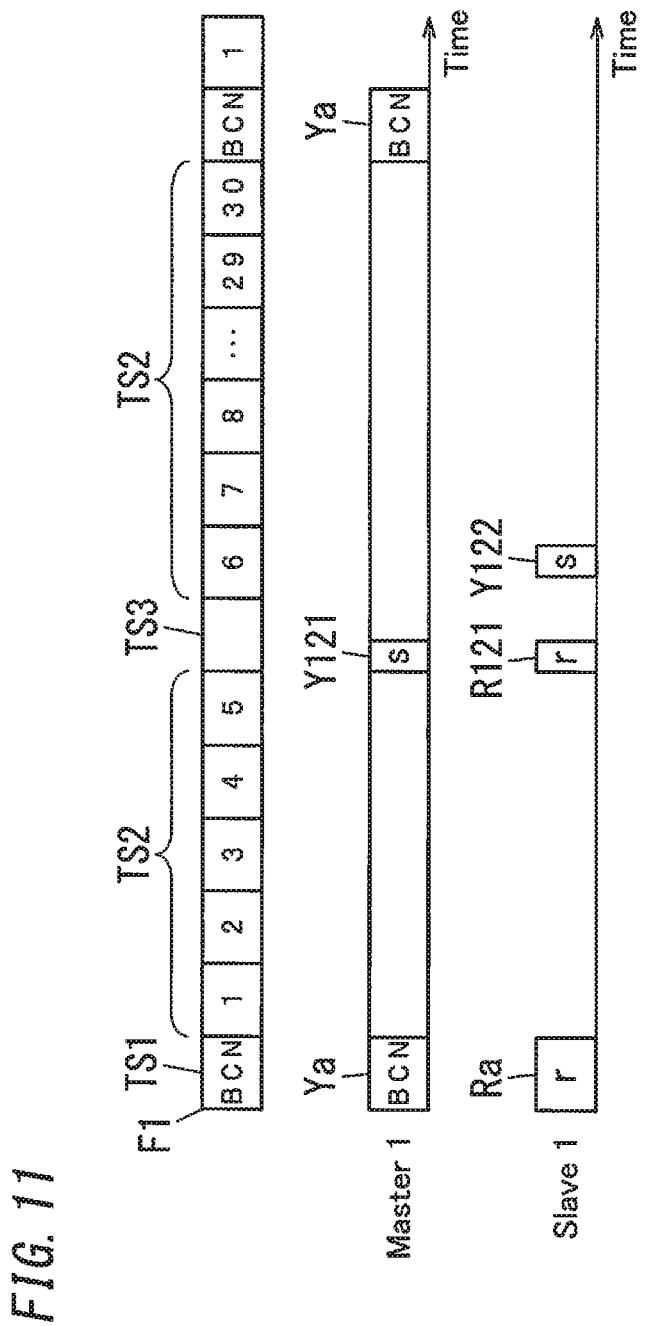
FIG. 11 is another sequence diagram of communication between the master and the slave of Embodiment 1.

Note that, when receiving the information signal from the master 1 in the downstream slot TS3, the slave 2 may send back a response signal in a predetermined upstream slot TS2. For example, the upstream slot TS2(6) may be set as the upstream slot TS2 in which the slave 2 sends back the response signal. In this case, as shown in FIG. 11, the master 1 sends an information signal Y121 to the slave 2 in the downstream slot TS3. Note that, in FIG. 11, "s" means sending, and "r" means receiving.

The slave 2 receives the information signal Y121 in the downstream slot TS3 (R121). When receiving the information signal Y121, the slave 2 sends a response signal Y122 to the master 1 in the upstream slot TS2(6).

Further, as shown in FIG. 12, a super frame SF1 constituted by multiple communication frames F1 may be available. Note that, in FIG. 12, "s" means sending, and "r" means receiving. In this case, a number of the communication frame F1 of the super frame SF1 of which the receiving process is performed in the downstream slot TS3 is preliminarily determined for each slave 2. Note that, in FIG. 12, the super frame SF1 is constituted by three communication frames F1.

First, the master 1 sends the beacon signal Ya in the beacon slot TS1. In terms of the synchronous communication, the beacon receiving cycle Ta is equal to a triple of the frame cycle L1, and the slave 2a, 2b, and 2c perform the beacon receiving operation Ra in the beacon slot TS1 of the first communication frame F1 to thereby receive the beacon signal Ya and then correct the synchronization.

The master 1 sends an information signal Y131 to the slave 2a in the downstream slot TS3 of the first communication frame F1. The slave 2a receives the information signal in the downstream slot TS3 of the first communication frame F1 (R131). Next, the master 1 sends an information signal Y132 to the slave 2b in the downstream slot TS3 of the second communication frame F1. The slave 2b receives the information signal Y132 in the downstream slot TS3 of the second communication frame F1 (R132). Thereafter, the master 1 sends an information signal Y133 to the slave 2c in the downstream slot TS3 of the third communication frame F1. The slave 2c receives the information signal in the downstream slot TS3 of the third communication frame F1 (R133).

Figure 13:
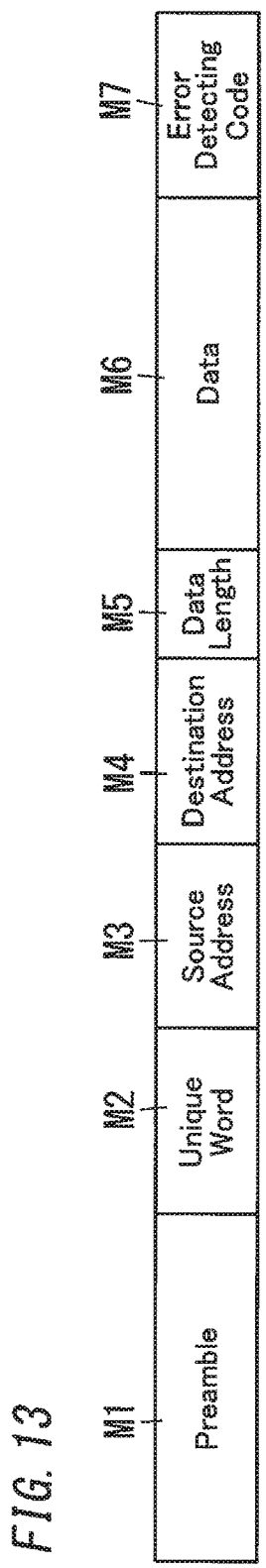
FIG. 13 is a schematic diagram of a format of a condition signal of Embodiment 1.

FIG. 13 shows a format of the condition signal (e.g., the on operation signal, the off operation signal, the human detection signal, the time up signal, the illuminance signal, and the temperature and humidity signal) to be sent from the slave 2 to the master 1. The condition signal is constituted by a preamble M1, a unique word M2, a source address M3, a destination address M4, a data length M5, data M6, and an error detecting code M7. The preamble M1 is a series of bits for bit synchronization in which "0" and "1" are arranged alternately. The unique word M2 is a series of bits for byte synchronization which is different from the preamble M1. The unique word M2 may be selected from a series of bits which is unlikely to be included in the data M6. The source address M3 indicates a unique address of the slave 2 as a source of this signal. The destination address M4 indicates a unique address of the master 1 as a destination of this signal. The data length M5 indicates the number of bytes of the data M6. The data M6 indicates information such as the on or off state of the handle, the detection result of humans, the measurement result of illuminance, the measurement results of temperature and humidity. The error detecting code M7 is an error detecting code generated by a predetermined algorithm from a series of bits of the source address M3 to the data M6, and may be based on cyclic redundancy check (CRC), for example.

The following description is made to an operation in a case of activating the master 1 and subsequently the slaves 2. Note that, activating the master 1 means allowing the master 1 to start to operate with power supplied from a commercial power supply. For example, when an activating switch provided to the master 1 is turned on or a breaker for starting and terminating supply of commercial power is turned on, the master 1 is activated.

The master 1 which is first activated sends the beacon signal Ya in the beacon slot TS1 at the frame cycle L1. Each of the slaves 2 which are subsequently activated performs initially a continuously receiving operation R1 (first receiving operation) of continuing the receiving operation throughout a time period T1 (first time period). The time period T1 allocated to this continuously receiving operation is longer than the frame cycle L1. Therefore, when the slave 2 is activated while the master 1 is in operation, the slave 2 can receive the beacon signal Ya sent from the master 1, within the time period T1. Subsequently, the slave 2 makes synchronization based on a time point of receiving the beacon signal Ya, and thereby establishing the synchronous communication with the master 1 by use of the communication frame F1.

Figure 14:
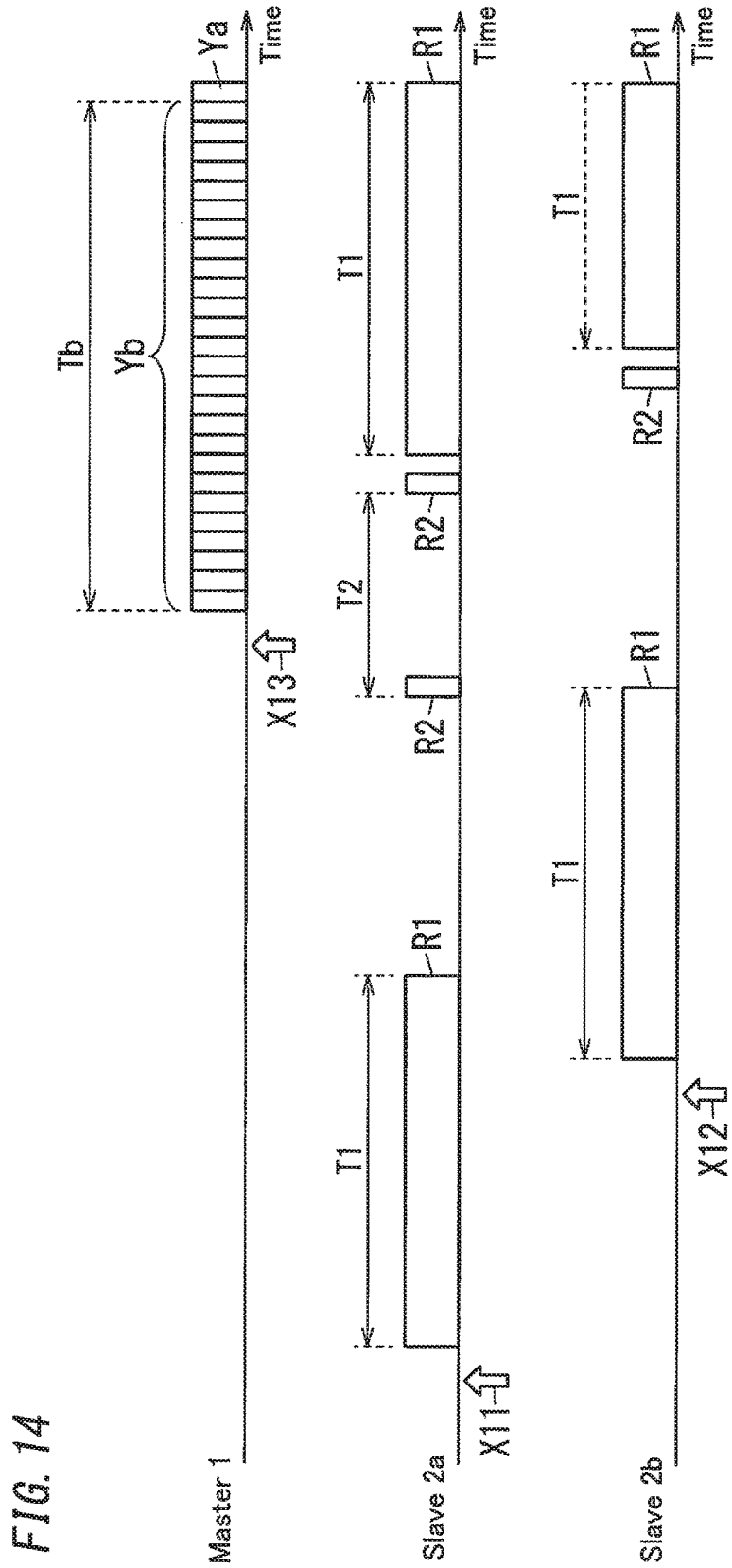
FIG. 14 is a sequence diagram of an operation of Embodiment 1 when the slaves are activated prior to the master.

The following description referring to FIG. 14 is made to an operation in a case of activating the slave 2 (2a, 2b) and subsequently the master 1. Note that, activating the slave 2 means allowing the slave 2 to start to operate with power supplied from a battery. For example, when an activating switch provided to the slave 2 is turned on or a battery is set in the slave 2, the slave 2 is activated.

At a time point X11 when the slave 2a is activated, and a time point X12 when the slave 2b is activated, the master 1 is not activated yet and thus does not send the beacon signal Ya. Each of the slaves 2a and 2b which are activated in advance performs initially the continuously receiving operation R1 (first receiving operation) of continuing the receiving operation throughout the time period T1. However, the master 1 is not activated yet, and therefore the slaves 2a and 2b cannot receive the beacon signal Ya within the time period T1. After the time period T1, each of the slaves 2a and 2b uses the communication frame F1 to establish asynchronous communication of communicating with the master 1 without making the synchronization. The slave 2 establishing the synchronous communication makes the synchronization based on the time point of receiving the beacon signal. In contrast, the slave 2 establishing the asynchronous communication uses the communication frame F1 based on a timing given by the slave 2 per se (e.g., a timing given by a time measuring function of the slave 2).

In the asynchronous communication, also the slave 2 performs the sending operation of sending a signal to the master 1 in the upstream slot TS2.

Additionally, the slave 2 establishing the asynchronous communication preforms an intermittently receiving operation R2 (second receiving operation) in the downstream slot TS3 at an integral multiple (e.g., single, double, and triple) of the frame cycle L1. The cycle at which the slave 2 in the asynchronous communication preforms the intermittently receiving operation R2 in the downstream slot TS3 of the communication frame F1 is referred to as an intermittently receiving cycle T2.

After the slaves 2a and 2b start the asynchronous communication, the master 1 is activated (X13). When activated, the master 1 sends successive activation signals Yb in a time period Tb (second time period), and subsequently sends the beacon signal Ya. The time period Tb is set to time longer than the intermittently receiving cycle T2. Therefore, the slaves 2a and 2b performing the intermittently receiving operation R2 can receive at least one of the successive activation signals Yb.

When receiving one the activation signals Yb, the slaves 2a and 2b start the continuously receiving operation R1 throughout the time period T1. The slaves 2a and 2b in the continuously receiving operation R1 can receive the beacon signal Ya sent from the master 1 after the master 1 completes sending the successive activation signals Yb. Thereafter, each of the slaves 2a and 2b makes the synchronization based on the time point of receiving the beacon signal Ya and thereby establishes the synchronous communication with the master 1 by use of the communication frame F1.

As described above, when the master 1 is activated prior to the slave 2, the slave 2 can receive the beacon signal Ya sent from the master 1 in the continuously receiving operation R1 performed immediately after activation, and thereby establishes the synchronous communication.

When the slave 2 is activated prior to the master 1, the slave 2 fails to receive the beacon signal Ya sent from the master 1 in the continuously receiving operation R1 performed immediately after activation. Hence, the slave 2 establishes the asynchronous communication by use of the communication frame F1 at the timing given by the slave 2 per se, and thereby performs the intermittently receiving operation R2. Thereby, the slave 2 receives the activation signal Yb from the activated master 1. After receiving the activation signal Yb, the slave 2 starts the continuously receiving operation R1. After receiving the beacon signal Ya sent from the master 1, the slave 2 starts the synchronous communication.

Consequently, in both cases where the slave 2 can receive the beacon signal Ya immediately after activation and thus can make the synchronization, and where the slave 2 cannot receive the beacon signal Ya immediately after activation and thus cannot make the synchronization, it is sufficient that the slave 2 corresponds to the communication scheme using the communication frame F1 only. In other words, the slave 2 is not required to correspond to communication schemes other than the communication scheme using the communication frame F1. Therefore, a load required to the communication process can be reduced.

Additionally, the master 1 performs sends the activation signals Yb successively to thereby notify the slaves 2 of activation of the master 1, and sends the beacon signal Ya after successively sending the activation signals Yb. When receiving one of the activation signals Yb in the intermittently receiving operation R2 of the asynchronous communication, the slave 2 ends the current operation and starts the continuously receiving operation R1. Therefore, the slave 2 can receive the beacon signal Ya from the master 1.

Consequently, the present communication system can allow the slave 2 to receive the beacon signal Ya to thereby make the synchronization with the master 1 irrespective of the activation order of the master 1 and the slave 2, and also capable of reducing a load necessary for the slave 2 to perform the communication process. Further, when the slave 2 fails to receive the beacon signal Ya immediately after activation and thus cannot make the synchronization with the master 1, the slave 2 performs the intermittently receiving operation R2. Therefore, it is possible to reduce a power consumption of the slave 2 which fails to make the synchronization.

The aforementioned communication system includes the slave 2, and the master 1 configured to establish wireless communication with the slave 2. The master 1 and the slave 2 are configured to communicate with each other by use of the communication frame F1 including the beacon slot TS1 (first time slot) allowing the master 1 to send the beacon signal Ya to the slave 2 and the downstream slot TS3 (second time slot) allowing the slave 2 to perform the receiving operation only.

The slave 2 is configured to, when activated, start the continuously receiving operation R1 (first receiving operation) of performing the receiving operation throughout the time period T1 (first time period) longer than one cycle of the communication frame F1. The slave 2 is configured to, when receiving the beacon signal Ya while performing the continuously receiving operation R1, perform, by use of the communication frame F1, the synchronous communication of making the synchronization with the master 1 based on the time point of receiving the beacon signal Ya, and communicating with the master 1. The slave 2 is configured to, when failing to receive the beacon signal Ya while performing the continuously receiving operation R1, perform, by use of the communication frame F1, the asynchronous communication of communicating with the master 1 without making the synchronization. The slave 2 is configured to, in the time period of the asynchronous communication, perform the intermittently receiving operation R2 (second receiving operation) using the downstream slot TS3 at the intermittently receiving cycle T2 being an integral multiple of one cycle of the communication frame F1.

The master 1 is configured to, when activated, send the successive activation signals Yb in the time period Tb (second time period) longer than the intermittently receiving cycle T2, and subsequently send the beacon signal Ya. The slave 2 is configured to, when receiving at least one of the successive activation signals Yb while being in the second receiving operation R2, start the continuously receiving operation R1.

Additionally, it is preferable that the slave 2 be configured to perform the following operation. The slave 2 measures a received signal intensity in a predetermined time period after start of a receiving process using the downstream slot TS3 each time performing the intermittently receiving operation R2. Note that, the predetermined time period is set not to extend over an anterior half of the downstream slot TS3. When the measured received signal intensity measured is equal to or smaller than a threshold value, it is considered that the activation signal Yb is not sent from the master 1 and the master 1 is not activated yet. Therefore, in this case, the slave 2 terminates the intermittently receiving operation R2 using the downstream slot TS3 even during the downstream slot TS3. When the measured received signal intensity measured is larger than the threshold value, the slave 2 continues the intermittently receiving operation R2 using the downstream slot TS3. Therefore, the power consumption of the slave 2 can be reduced compared with a case where the slave 2 continues the receiving operation throughout the downstream slot TS3 irrespective of the received signal intensity.

The following description referring to FIG. 15 is made to a specific situation. In this specific situation, the slave 2 receives the beacon signal Ya and make the synchronization, and establishes the synchronous communication with the master 1 by use of the communication frame F1. However, the subsequent beacon signal Ya from the master 1 is missing.

While the synchronous communication using the communication frame F1 is established between the master 1 and the slave 2, the master 1 sends the beacon signal Ya at the frame cycle L1. The slave 2 performs the beacon receiving operation Ra at the beacon receiving cycle Ta by use of the beacon slot TS1 of the communication frame F1. The slave 2 corrects the synchronization by use of the beacon signal Ya received in the beacon receiving operation Ra.

In the time period of the synchronous communication, when failing to successively receive the beacon signal Ya a predetermined number of times (in FIG. 15, three times) while performing the beacon receiving operation Ra using the communication frame F1, the slave 2 starts the continuously receiving operation R1 with the time period T1. Thereafter, when receiving the beacon signal Ya from the master 1 in this continuously receiving operation R1, the slave 2 performs the synchronous communication using, the communication frame F1. Therefore, when the beacon signal Ya is temporarily missing due to instantaneous power failure of the commercial power supply, noise, or the like while the synchronous communication is established between the master 1 and the slave 2, the synchronization between the master 1 and the slave 2 can be recovered quickly.

Note that, for example, when a power failure of the commercial power supply occurs, or an activating switch provided to the master 1 is turned off, or a breaker for supplying power to the master 1 is turned off, the master 1 may be deactivated. In this situation, even when performing the continuously receiving operation R1, the slave 2 cannot receive the beacon signal Ya from the master 1. Therefore, the slave 2 starts the asynchronous communication. When receiving, in the intermittently receiving operation R2 of the asynchronous communication, the activation signal Yb from the master 1 activated again, the slave 2 starts the continuously receiving operation R1 in a similar manner to that shown in FIG. 14. When receiving the beacon signal Ya sent from the master 1 after successive transmission of the activation signals Yb, the slave 2 tries to make the synchronization again.

Therefore, when the beacon signal Ya is missing, the slave 2 starts the intermittently receiving operation R2 of the asynchronous communication after the continuously receiving operation R1. Consequently, when the master 1 is accidentally deactivated while the synchronous communication is established between the master 1 and the slave 2, the slave 2 starts the intermittently receiving operation R2 of the asynchronous communication. This can lead to a decrease in the power consumption of the slave 2.

Note that, the master 1 and the slave 2 may perform operations illustrated in FIG. 16 when the beacon signal Ya is missing.

First, while the synchronous communication is established between the master 1 and the slave 2, the master 1 sends the beacon signal Ya at the frame cycle L1. The slave 2 performs the beacon receiving operation Ra at the beacon receiving cycle Ta by use of the beacon slot TS1 of the communication frame F1. The slave 2 corrects the synchronization based on the beacon signal Ya received in the beacon receiving operation Ra. Note that, in FIG. 16, the frame cycle L1 is assumed to be equal to the beacon receiving cycle Ta.

In the time period of the synchronous communication, when failing to successively receive the beacon signal Ya a predetermined number of times (in FIG. 16, three times) while performing the beacon receiving operation Ra intermittently, the slave 2 starts the continuously receiving operation R1 with the time period T1. When failing to receive the beacon signal Ya from the master 1 even when performing the continuously receiving operation R1, the slave 2 starts the intermittently receiving operation R2 of the asynchronous communication. Note that, in FIG. 16, the beacon signal Ya is temporarily missing due to noise N1.

When an event occurs while the slave 2 performs the intermittently receiving operation R2 (X21), the slave 2 sends a condition signal Y1 for notifying the master 1 of contents of the event, by use of the upstream slot TS2 of the communication frame F1. When receiving a response signal Y2 sent back from the master 1 receiving the condition signal Y1, within the upstream slot TS2 used for sending the condition signal Y1 (or any time slot), the slave 2 starts the continuously receiving operation R1 with the time period T1. Subsequently, when receiving the beacon signal Ya from the master 1 in this continuously receiving operation R1, the slave 2 starts the synchronous communication.

If the slave 2 fails to receive the beacon signal Ya from the master 1 due to temporal noise or an interference radio wave and thereby the synchronization is lost, the synchronization can be recovered with a low power consumption. In this regard, the master 1 may include information (continuously receiving instructions) of instructions to start the continuously receiving operation R1 in the response signal Y2 to be sent back. In this case, the slave 2 starts the continuously receiving operation R1 only when the received response signal Y2 includes the continuously receiving instructions.

Figure 17:
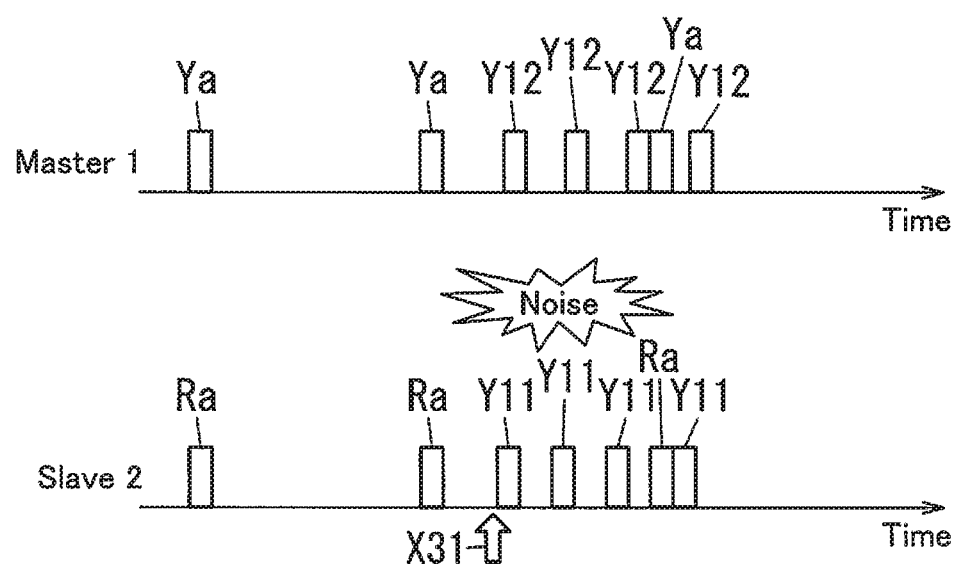
FIG. 17 is a sequence diagram of a resending process for the condition signal of Embodiment 1.

Further, as shown in FIG. 17, when an event occurs in the time period of the synchronous communication (X31), the slave 2 sends a condition signal Y11 to the master 1 in the upstream slot TS2. The master 1 sends back a response signal Y12 as a reply to the condition signal Y11. However, a noise N2 occurs and thus the slave 2 fails to receive the response signal Y12. In this case, the slave 2 resends the condition signal Y11. The process of resending the condition signals through the synchronous communication is performed up to three times (the number of times of sending the condition signal is total four times). Note that, the process of resending by the slave 2 is ended when the slave 2 receives the response signal Y12.

Figure 18:
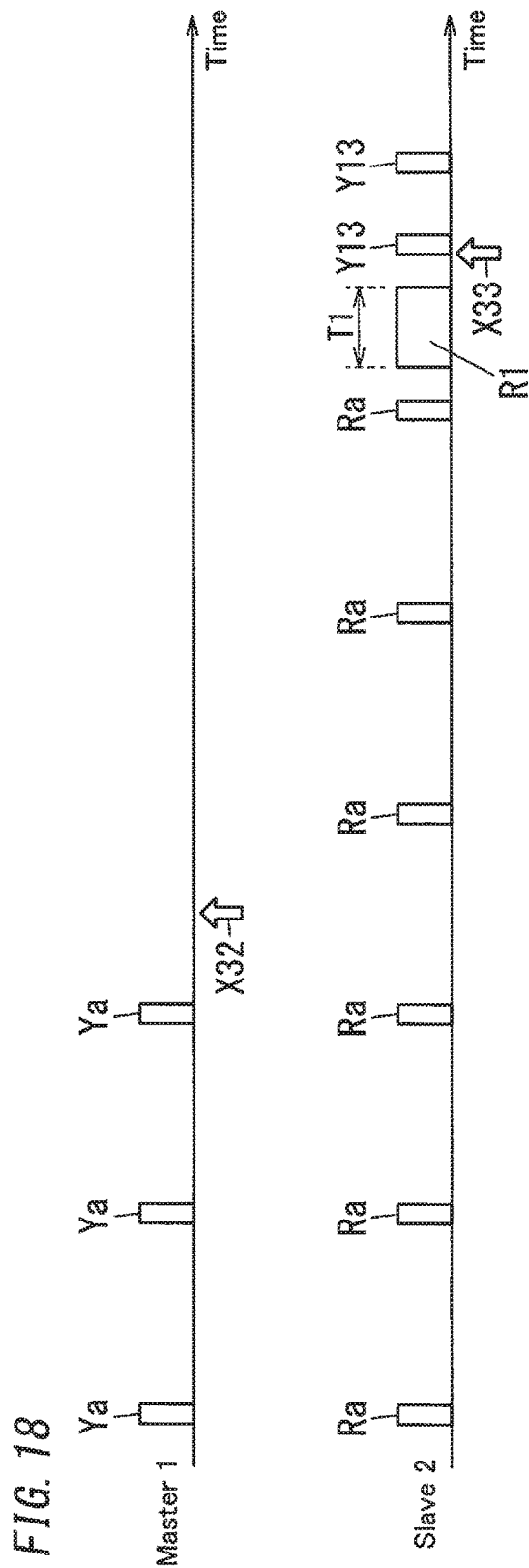
FIG. 18 is another sequence diagram of a resending process for the condition signal of Embodiment 1.

Further, as shown in FIG. 18, it is supposed that the master 1 is deactivated (X32) while the synchronous communication (the beacon receiving operation Ra) is established between the master 1 and the slave 2. In this case, when failing to successively receive the beacon signal Ya the predetermined number of times (in FIG. 18, three times) while performing the beacon receiving operation Ra intermittently, the slave 2 starts the continuously receiving operation R1 with the time period T1. When failing to receive the beacon signal Ya from the master 1 even in the continuously receiving operation R1, the slave 2 starts the asynchronous communication.

When an event occurs (X33) while the slave 2 establishes the asynchronous communication, the slave 2 sends the condition signal Y13 to the master 1 in the upstream slot TS2. However, the master 1 is in its off state, and therefore the slave 2 cannot receive the response signal. Hence, the slave 2 resends the condition signal Y13. The process of resending the condition signals through the asynchronous communication is performed up to one time (the number of times of sending the condition signal is total two times). Note that, the process of resending by the slave 2 is ended when the slave 2 receives the response signal.

While the slave 2 performs the asynchronous communication, there are relatively high possibilities that the master 1 is in the off state and that at least one of noise, interference radio waves, and the like exists. Therefore, when the slave 2 resends the condition signal, it would not be expected that the master 1 sends back the response signal. In view of this, as described above, the upper limit number of times (one time) of resending through the asynchronous communication is set to be smaller than the upper limit number of times (three times) of resending through the synchronous communication. Therefore, the number of times of useless resending of the condition signal by the slave 2 can be reduced, and thus the power consumption of the slave 2 can be decreased.

Figure 19:
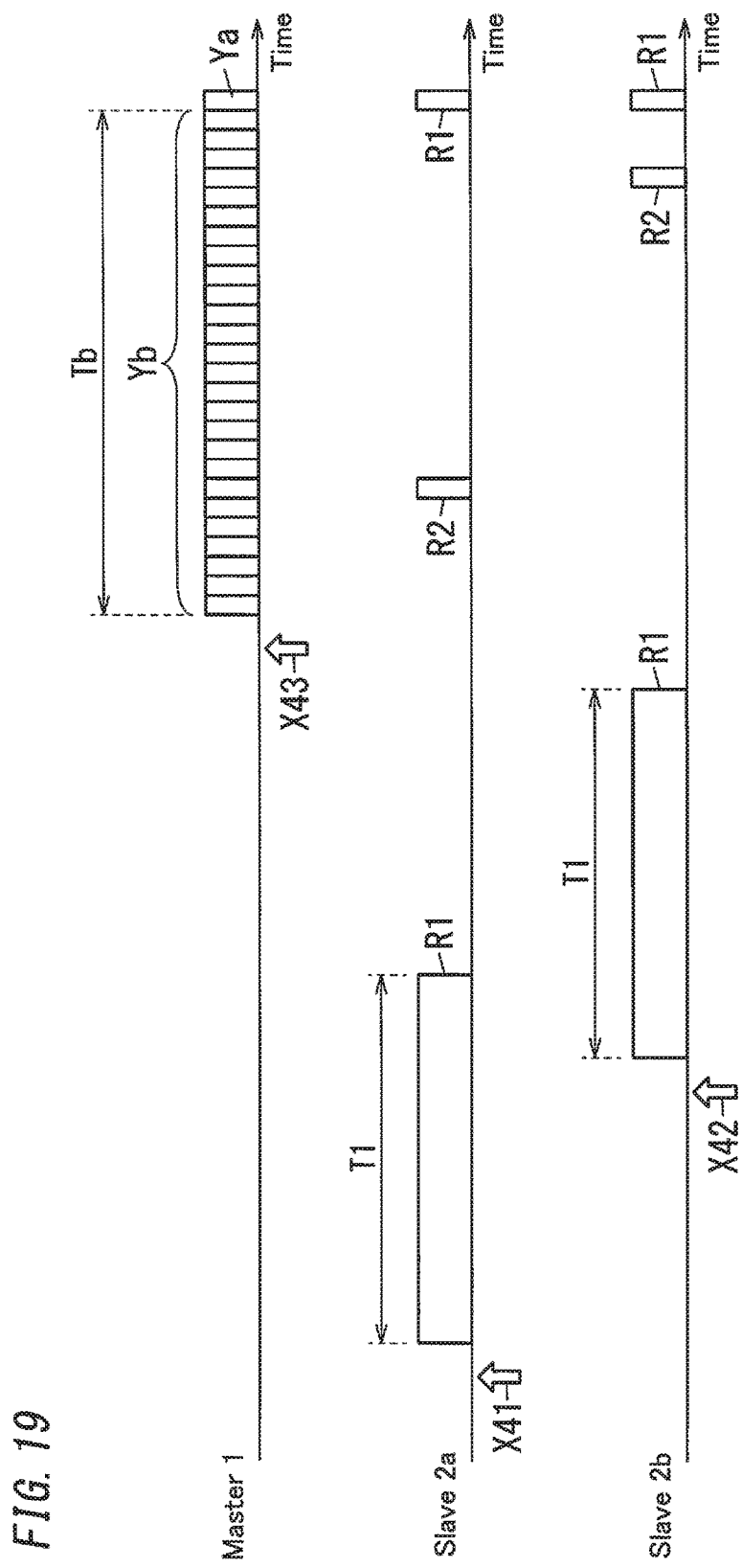
FIG. 19 is a sequence diagram of an operation of Embodiment 1 when the slaves are activated prior to the master.

FIG. 19 illustrates another operation in a case where the slave 2 (2a, 2b) is activated prior to the master 1.

At a time point X41 when the slave 2a is activated, and a time point X42 when the slave 2b is activated, the master 1 is not activated yet and thus does not send the beacon signal Ya. Each of the slaves 2a and 2b which are activated in advance performs the continuously receiving operation R1 of continuing the receiving operation throughout the time period T1. However, the master 1 is not activated yet, and therefore the slaves 2a and 2b cannot receive the beacon signal Ya within the time period T1. In this regard, after the time period T1, the slave 2 establishes the asynchronous communication to perform the intermittently receiving operation R2 after the time period T1.

After the slaves 2a and 2b start the asynchronous communication, the master 1 is activated (X43). When activated, the master 1 sends the successive activation signals Yb in the time period Tb, and subsequently sends the beacon signal Ya. Therefore, the slaves 2a and 2b establishing the asynchronous communication perform the intermittently receiving operation R2 and thus can receive at least one of the successive activation signals Yb.

The control circuit 11 of the master 1 adds information regarding a remaining number of times of sending the successive activation signals Yb in the time period Tb, to each of the successive activation signals Yb. The information regarding the remaining number of times is information of the remaining number of successive activation signals Yb to be sent in the time period Tb or information indicative of the number of the activation signal Yb in a case where the total number of the activation signals to be sent in the time period Tb is already known.

When receiving one of the successive activation signals Yb, each of the slaves 2a and 2b can estimate a timing of sending the beacon signal Ya from the information regarding the remaining number of times of sending the activation signals Yb. For example, each of the slaves 2a and 2b preliminarily stores information of a signal width of each activation signal Yb, and multiplies the signal width of each activation signal Yb by the remaining number of times of sending the activation signals Yb to estimate the timing of sending the beacon signal Ya subsequent to the activation signals Yb. Each of the slaves 2a and 2b starts the continuously receiving operation R1 based on the estimated timing of sending the beacon signal Ya. In more detail, each of the slaves 2a and 2b starts the continuously receiving operation R1 in time with the estimated timing of sending the beacon signal Ya. Alternatively, each of the slaves 2a and 2b may start the continuously receiving operation R1 at a timing slightly earlier than the estimated timing of sending the beacon signal Ya.

After starting the continuously receiving operation R1, each of the slaves 2a and 2b terminates the continuously receiving operation R1 in response to reception of the beacon signal Ya. In the subsequent processing, each of the slaves 2a and 2b makes the synchronization based on the time point of receiving the beacon signal Ya, and thereby performing the synchronous communication with the master 1.

The slave 2 can avoid useless reception of the activation signal Yb sent repeatedly in a period from the time of receiving the activation signal Yb by the slave 2 to the time of receiving the beacon signal Ya by the slave 2. Therefore, the power consumption of the slave 2 can be reduced.

Note that, the embodiments of the present invention are not limited so that the slave 2 is always configured to start the continuously receiving operation R1 in time with the estimated timing of sending the beacon signal Ya. The slave 2 may be configured to perform the receiving operation (the beacon receiving operation Ra) throughout the sending time period of the beacon signal Ya, which means the time period for the beacon slot TS1 in time with the estimated timing of sending the beacon signal Ya.

Embodiment 2

Figure 20:
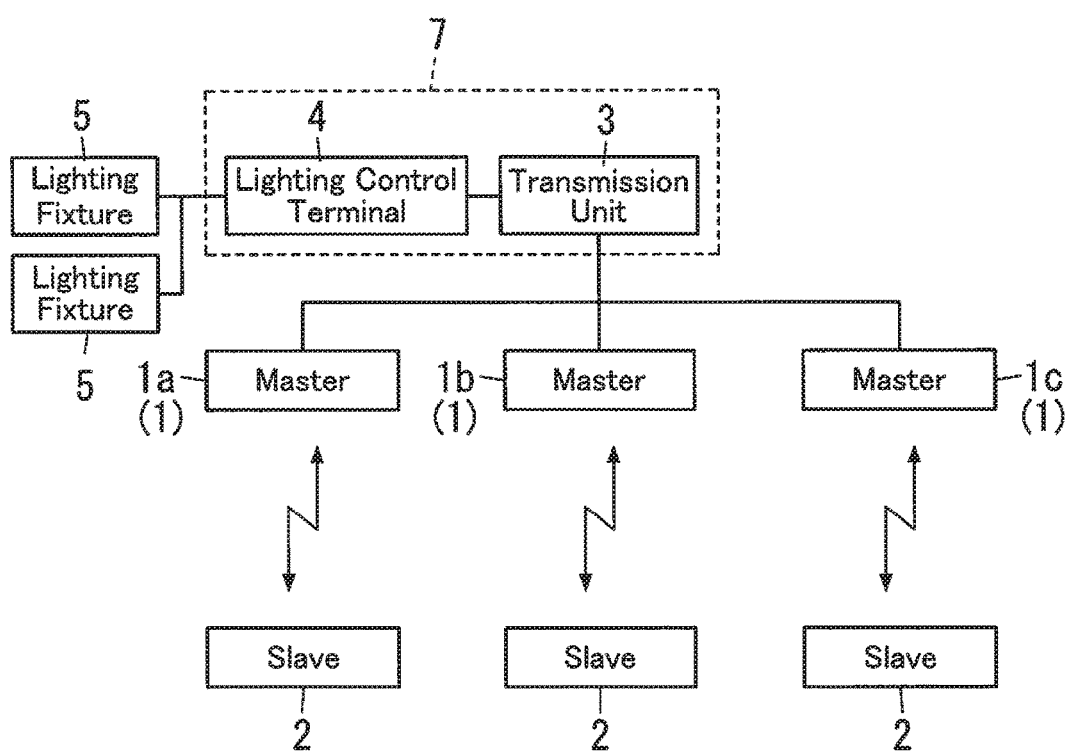
FIG. 20 is a schematic diagram of a whole configuration of a communication system of Embodiment 2.

FIG. 20 illustrates the configuration of the communication system of the present embodiment. The present embodiment differs from Embodiment 1 in including multiple masters 1. Note that, other components of the present embodiment are the same as those of Embodiment 1, and similar components are designated by similar reference signs to omit redundant explanations thereof. Note that, in the following description, reference sings 1a, 1b, 1c, . . . are used to distinguish the multiple masters 1 from each other, if necessary.

Figure 21:
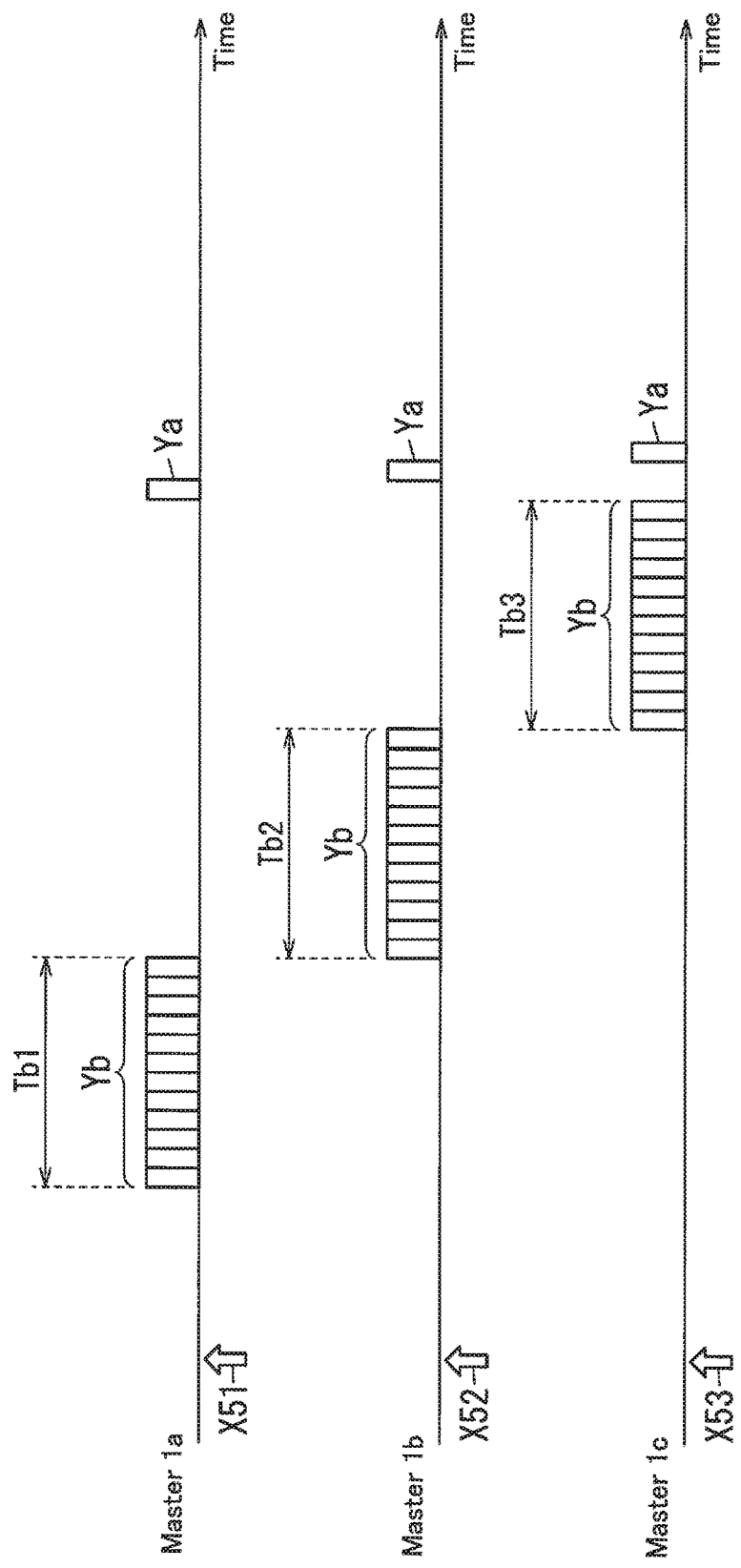
FIG. 21 is a sequence diagram of an operation of Embodiment 2 when the masters are activated.
Figure 22:
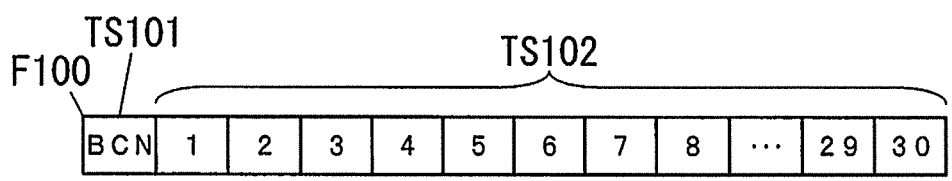
FIG. 22 is a schematic diagram of a format of a conventional communication frame.

The wireless communication circuits 12 of the three masters which are the master 1a, the master 1b, and the master 1c shown in FIG. 20 perform wireless communication with the slaves 2 by use of the same frequency. Further, the master 1a, the master 1b, and the master 1c are interconnected by the communication line. The wired communication circuits 13 of the master 1a, the master 1b, and the master 1c perform wired communication with each other. The operations of the master 1a, the master 1b, and the master 1c after activated are described with reference to FIG. 21.

First, the masters 1a, 1b, and 1c are activated (X51, X52, X53). Thereafter, the masters 1a, 1b, and 1c communicate with each other before sending the successive activation signals Yb, and determine timings of sending the successive activation signals Yb by their own.

The masters 1a, 1b, and 1c determine an order of the masters sending the activation signals Yb. For example, the order of the masters sending the activation signals Yb may be set according to a descending order (or an ascending order) of addresses or device numbers of the masters 1a, 1b, and 1c. Alternatively, when the masters 1a, 1b, and 1c include random number generators for generating random numbers, the order of the masters sending the activation signals Yb may be set according to a descending order (or an ascending order) of the generated random numbers.

The masters 1a, 1b, and 1c determine timings of starting the time periods Tb1, Tb2, and Tb3 so that the time period Tb1 in which the master 1a sends the activation signals Yb, the time period Tb2 in which the master 1b sends the activation signals Yb, and the time period Tb3 in which the master 1c sends the activation signals Yb are not overlapped with each other.

Therefore, in a case where the multiple masters 1 perform wireless communication with the slaves 2 by use of the same frequency, it is possible to avoid interference between the activation signals Yb sent from the multiple masters 1 even when the masters are activated simultaneously.

Additionally, the master 1a sends the beacon signal Ya after sending the successive activation signals Yb in the time period Tb1. The master 1b sends the beacon signal Ya after sending the successive activation signals Yb in the time period Tb2. The master 1c sends the beacon signal Ya after sending the successive activation signals Yb in the time period Tb3. Each of the masters 1a, 1b, and 1c sets a timing of sending the beacon signal Ya to be subsequent to the time periods Tb of all other masters 1. In this case, after the time periods Tb1, Tb2, and Tb3 of the masters 1a, 1b, and 1c are ended, the masters 1a, 1b, and 1c send the beacon signals Ya individually.

Therefore, in a case where the multiple masters 1 perform wireless communication with the slaves 2 by use of the same frequency, it is possible to avoid interference between the beacon signal Ya and the activation signal Yb even when the masters are activated simultaneously.

Additionally, the timings of sending the beacon signals Ya by the masters 1a, 1b, and 1c are set so as not to overlap with each other. Therefore, in a case where the multiple masters 1 perform wireless communication with the slaves 2 by use of the same frequency, it is possible to avoid interference between the beacon signals Ya even when the masters are activated simultaneously.

Embodiment 3

In the present embodiment, lighting control performed by the communication system shown in FIG. 1 is described. Note that, components similar to those of Embodiment 1 are designated by common reference signs to avoid redundant explanations thereof.

The hot-wire sensor terminal 22 (see FIG. 4) is one of the slaves 2 constituting the communication system. The hot-wire sensor terminal 22 includes the hot-wire detection circuit 222 (detection circuit) configured to detect hot-wire to be radiated from a human body, and the control circuit 221 configured to determine whether a human body has been detected, based on the detection result of the hot-wire detection circuit 222. Additionally, the hot-wire sensor terminal 22 includes the wireless communication circuit 223 configured to perform wireless communication with the master 1 and configured to send the human detection signal (detection signal) when the control circuit 221 determines that the human body has been detected.

In this hot-wire sensor terminal 22, the hot-wire detection circuit 222 tries to detect hot-wire (infrared) to be radiated from the human body. The control circuit 221 determines whether the human body has been detected, based on the detection result of the hot-wire detection circuit 222. When determining that the human body has been detected, the control circuit 221 sends the human detection signal (information for controlling the lighting fixture 5 to a lighting state) through the wireless communication circuit 223. In summary, the hot-wire sensor terminal 22 sends the human detection signal in a wireless manner in response to detection of the human body.

When receiving the human detection signal from the hot-wire sensor terminal 22, the master 1 sends the human detection signal to the transmission unit 3, and further sends a response signal to the hot-wire sensor terminal 22. When receiving the human detection signal from the master 1, the transmission unit 3 provides the lighting control terminal 4 with instructions to turn on the lighting fixture 5 to be controlled according to the hot-wire sensor terminal 22 which is the sender of the signal. Based on the instructions from the transmission unit 3, the lighting control terminal 4 turns on the lighting fixture 5 to be controlled.

When the lighting fixture 5 to be controlled is changed into the lighting state, the lighting control terminal 4 sends, to the transmission unit 3, the monitoring signal indicates that the lighting fixture 5 to be controlled is in the lighting state. The transmission unit 3 sends this monitoring signal to the master 1 and the manual controlling device 6. The master 1 receives the monitoring signal sent from the transmission unit 3, and then sends this monitoring signal to the switch terminal 21.

In the switch terminal 21 (see FIG. 3), the wireless communication circuit 213 receives the monitoring signal. And, the control circuit 211 of the switch terminal 21 changes a visual condition of an LED or the like of the switch terminal (e.g., the LED being on, the LED being off, and a light emission color) so as to indicate that the lighting fixture 5 to be controlled is in the on state.

Further, in the manual controlling device 6 (see FIG. 7), the wired communication circuit 63 receives the monitoring signal sent from the transmission unit 3. And, the control circuit 61 changes a visual condition of an LED or the like of the manual controlling device (e.g., the LED being on, the LED being off, and a light emission color) so as to indicate that the lighting fixture 5 to be controlled is in the on state.

When the master 1 is in the off state, the hot-wire sensor terminal 22 cannot receive the response signal from the master 1 as a reply to the human detection signal. When noise, an interference radio wave, or the like occurs, the hot-wire sensor terminal 22 is unlikely to receive the response signal from the master 1 as a reply to the human detection signal. When failing to receive the response signal as a reply to the sent human detection signal, the hot-wire sensor terminal 22 resends the human detection signal. Further, even if failing to receive the response signal as a reply to the sent human detection signal, the hot-wire sensor terminal 22 still sends the human detection signal based on a new detection result. In summary, the hot-wire sensor terminal 22 is likely to send the human detection signal under a condition where there would be a high possibility that the master 1 does not send the response signal as a reply. Thus, the hot-wire sensor terminal 22 consumes power uselessly.

If the hot-wire sensor terminal 22 fails to receive the beacon signal Ya from the master 1 and the wireless communication circuit 223 sends the human detection signal through the asynchronous communication, it is considered that the master 1 is likely to be off, noise is likely to occur, and an interference radio wave is likely to occur.

Hence, in the hot-wire sensor terminal 22, after the wireless communication circuit 223 sends the human detection signal through the asynchronous communication due to failure in receiving the beacon signal Ya from the master 1, the control circuit 221 sets a time period (sending prohibition time period) of prohibiting sending of the human detection signal. For example, to prohibit sending of the human detection signal, the control circuit 221 terminates the operation of the hot-wire detection circuit 222, or terminates the sending process of the wireless communication circuit 223. Further, the sending prohibition time period is set to start after completion of the communication process of the human detection signal through the asynchronous communication. The sending prohibition time period has a predetermined length of time. Therefore, it is possible to reduce the power consumption of the hot-wire sensor terminal 22 under a condition where there would be a high possibility that the master 1 does not send the response signal as a reply.

When the control circuit 221 determines that the human body has been detected, the timer 224 of the hot-wire sensor terminal 22 starts to measure the holding time. When the control circuit 221 again determines that the human body has been detected while the timer 224 measures the holding time, the timer 224 resets a measured value of the holding time and subsequently restarts to measure the holding time. When the timer 224 completes measurement of the holding time (the time is up), the control circuit 221 sends the time up signal (information for controlling the lighting fixture 5 to an off state) through the wireless communication circuit 223.

When receiving the time up signal from the hot-wire sensor terminal 22, the master 1 sends this time up signal to the transmission unit 3, and sends the response signal to the hot-wire sensor terminal 22. When receiving the time up signal from the master 1, the transmission unit 3 provides the lighting control terminal 4 with instructions to turn off the lighting fixture 5 to be controlled according to the hot-wire sensor terminal 22 as the source. According to the instructions from the transmission unit 3, the lighting control terminal 4 turns off the lighting fixture 5 to be controlled.

In summary, while the timer 224 of the hot-wire sensor terminal 22 measures the holding time, the lighting fixture 5 to be controlled according to this hot-wire sensor terminal 22 is in the on state. After the timer 224 of the hot-wire sensor terminal 22 completes measuring the holding time, the lighting fixture 5 to be controlled according to this hot-wire sensor terminal 22 is in the off state.

When the lighting fixture 5 to be controlled is turned off, the lighting control terminal 4 sends, to the transmission unit 3, the monitoring signal indicating that the lighting fixture 5 to be controlled is in the off state, and the transmission unit 3 sends this monitoring signal to the master 1 and the manual controlling device 6. The master 1 receives the monitoring signal sent from the transmission unit 3, and sends this monitoring signal to the switch terminal 21.

Each of the switch terminal 21 and the manual controlling device 6 changes, based on the received monitoring signal, the visual condition of its own LED or the like (e.g., the LED being on, the LED being off, and a light emission color) so as to indicate that the lighting fixture 5 to be controlled is in the off state.

Note that, it is preferable that the control circuit 221 shorten the cycle at which the wireless communication circuit 223 performs the receiving operation while the timer 224 measures the holding time. For example, in establishing the synchronous communication or the asynchronous communication, the wireless communication circuit 223 performs the additional receiving process in the upstream slot TS2 of the communication frame F1, and thereby shortening the cycle of the receiving operation. Accordingly, it is possible to increase a probability of receiving the response signal sent back from the master 1.

Note that, the lighting fixture 5 can be controlled by the switch terminal 21 and the manual controlling device 6. When the handle 212 of the switch terminal 21 is turned to the on position, the control circuit 211 sends the on operation signal through the wireless communication circuit 213.

When receiving the on operation signal from the switch terminal 21, the master 1 sends this on operation signal to the transmission unit 3, and further sends the response signal as a reply, to the switch terminal 21. When receiving the on operation signal from the master 1, the transmission unit 3 provides the lighting control terminal 4 with instructions to turn on the lighting fixture 5 to be controlled according to the switch terminal 21 as the source. According to the instructions from the transmission unit 3, the lighting control terminal 4 turns on the lighting fixture 5 to be controlled.

When the lighting fixture 5 to be controlled is turned on, the lighting control terminal 4 sends, to the transmission unit 3, the monitoring signal indicating that the lighting fixture 5 to be controlled is in the on state, and the transmission unit 3 sends this monitoring signal to the master 1 and the manual controlling device 6. The master 1 receives the monitoring signal sent from the transmission unit 3, and sends this monitoring signal to the switch terminal 21.

Each of the switch terminal 21 and the manual controlling device 6 changes, based on the received monitoring signal, the visual condition of its own LED or the like (e.g., the LED being on, the LED being off, and a light emission color) so as to indicate that the lighting fixture 5 to be controlled is in the on state.

When the handle 212 of the switch terminal 21 is turned to the off position, the control circuit 211 sends the off operation signal through the wireless communication circuit 213.

When receiving the off operation signal from the switch terminal 21, the master 1 sends this off operation signal to the transmission unit 3, and further sends the response signal as a reply, to the switch terminal 21. When receiving the off operation signal from the master 1, the transmission unit 3 provides the lighting control terminal 4 with instructions to turn off the lighting fixture 5 to be controlled according to the switch terminal 21 as the source. According to the instructions from the transmission unit 3, the lighting control terminal 4 turns off the lighting fixture 5 to be controlled.

When the lighting fixture 5 to be controlled is turned off, the lighting control terminal 4 sends, to the transmission unit 3, the monitoring signal indicating that the lighting fixture 5 to be controlled is in the off state, and the transmission unit 3 sends this monitoring signal to the master 1 and the manual controlling device 6. The master 1 receives the monitoring signal sent from the transmission unit 3, and sends this monitoring signal to the switch terminal 21.

Each of the switch terminal 21 and the manual controlling device 6 changes, based on the received monitoring signal, the visual condition of its own LED or the like (e.g., the LED being on, the LED being off, and a light emission color) so as to indicate that the lighting fixture 5 to be controlled is in the off state.

Note that, in cases where the handle 62 of the manual controlling device 6 is turned to the on and off positions, the lighting fixture 5 is turned on and off, and the visual conditions of the LEDs or the like of the switch terminal 21 and the manual controlling device 6 are changed in a similar manner to the cases where the handle 212 of the switch terminal 21 is turned to the on and off positions.

For example, the monitoring signal (signal indicative of the state of the lighting fixture 5) is sent in a wireless manner from the master 1 by broadcasting, and thus can be received by the hot-wire sensor terminal 22. In the hot-wire sensor terminal 22, when the wireless communication circuit 223 receives the monitoring signal indicating that the lighting fixture 5 is in the off state from the master 1 while the timer 224 measures the holding time, the timer 224 stops measuring the holding time and resets the measured value. In summary, when the lighting fixture 5 is turned on according to detection of the human body by the hot-wire sensor terminal 22 and subsequently the lighting fixture 5 is turned off according to the off operation of the switch terminal 21 or the manual controlling device 6, time measurement by the timer 224 of the hot-wire sensor terminal 22 can be stopped. Therefore, it is possible to prevent the timer 224 from continuing the useless time measuring operation, and thus the power consumption of the hot-wire sensor terminal 22 can be reduced.

Note that, the present embodiment relates to control of the lighting fixture 5 by the lighting control terminal 4. However, the configuration of the present embodiment can be available for control of a device (e.g., an air conditioner, and a security device) other than the lighting fixture.

SUMMARY

As described above, the communication system includes: a slave 2; and one or multiple masters 1 configured to establish wireless communication with the slave 2. The one or multiple masters 1 and the slave 2 are configured to communicate with each other by use of a communication frame including a beacon slot TS1 (first time slot) allowing the one or multiple masters 2 to send a beacon signal Ya to the slave 2 and a downstream slot TS3 (second time slot) allowing the slave 2 to perform a receiving operation only. The slave 2 is configured to, when activated, start a first receiving operation (continuously receiving operation R1) of performing the receiving operation throughout a time period T1 (first time period) longer than one cycle of the communication frame. The slave 2 is configured to, when receiving the beacon signal Ya while performing the first receiving operation, perform, by use of the communication frame, synchronous communication of making synchronization with the one or multiple master 1 based on a time point of receiving the beacon signal Ya, and communicating with the one or multiple master 1. The slave 2 is configured to, when failing to receive the beacon signal Ya while performing the first receiving operation, perform, by use of the communication frame, asynchronous communication of communicating with the one or multiple master 1 without making the synchronization. The slave 2 is configured to, in asynchronous communication, perform a second receiving operation (intermittently receiving operation R2) using the second time slot at an intermittently receiving cycle being an integral multiple of one cycle of the communication frame.

The one or multiple master 1 is configured to, when activated, send successive activation signals Yb in a time period Tb (second time period) longer than the intermittently receiving cycle, and subsequently send the beacon signal Ya. The slave 2 is configured to, when receiving at least one of the successive activation signals Yb while being in the intermittently receiving operation R2, start a third receiving operation.

According to this configuration, in the communication system, when the master 1 is activated prior to the slave 2, the slave 2 can receive the beacon signal sent from the master 1 in the first receiving operation performed immediately after activation, and thereby establishes the synchronous communication by use of the communication frame. In contrast, when the slave 2 is activated prior to the master 1, the slave 2 fails to receive the beacon signal Ya sent from the master 1 in the continuously receiving operation R1 performed immediately after activation. Hence, the slave 2 establishes the asynchronous communication by use of the communication frame at the timing given by the slave 2 per se, and thereby performs the intermittently receiving operation R2. Thereby, the slave 2 receives the activation signal Yb from the activated master 1. After receiving the activation signal Yb, the slave 2 starts the third receiving operation. After receiving the beacon signal Ya sent from the master 1, the slave 2 starts the synchronous communication. Consequently, in both cases where the slave 2 can receive the beacon signal Ya immediately after activation and thus can make the synchronization, and where the slave 2 cannot receive the beacon signal Ya immediately after activation and thus cannot make the synchronization, it is sufficient that the slave 2 corresponds to the communication scheme using the communication frame F1 only. Therefore, a load required to the communication process can be reduced.

Additionally, the master 1 sends the successive activation signals Yb when activated to notify the slave 2 of activation of the master 1, and sends the beacon signal Ya after sending the successive activation signals Yb. When receiving at least one of the activation signals Yb in the intermittently receiving operation R2 of the asynchronous communication, the slave 2 can start the continuously receiving operation R1 and thereby receiving the beacon signal Ya from the master 1.

Accordingly, the communication system offers advantageous effects of allowing the slave 2 to receive the beacon signal Ya to thereby make synchronization with the master 1 irrespective of the activation order of the master 1 and the slave 2, and also of reducing a load necessary for the slave 2 to perform the communication process.

In a preferable aspect, an operation time period of the third receiving operation is a time period equal to the time period T1 (the first time period).

According to this configuration, when receiving the activation signal Yb from the master 1 after activated, the communication system can perform a receiving operation for a time period equal to the time period T1, which means the continuously receiving operation R1.

In a preferable aspect, the slave 2 may be configured to measure a received signal intensity in a predetermined time period after start of a receiving process using the downstream slot TS3 each time performing the intermittently receiving operation R2. The slave 2 may be configured to, when the received signal intensity measured is equal to or less than a threshold value, terminate the receiving process using the downstream slot TS3.

According to this configuration, the power consumption of the slave 2 can be reduced compared with a case where the slave 2 continues the receiving operation throughout the downstream slot TS3 irrespective of the received signal intensity.

In a preferable aspect, the slave 2 may be configured to correct the synchronization based on the beacon signal Ya to be received at a predetermined cycle in performing the synchronous communication. The slave 2 may be configured to, when failing to successively receive the beacon signal Ya a predetermined number of times, start the continuously receiving operation R1.

According to this configuration, if the slave 2 fails to receive the beacon signal Ya from the master 1 and thereby the synchronization is lost, the synchronization can be recovered with a low power consumption.

In a preferable aspect, the slave 2 may be configured to, after sending a transmission signal to the one or multiple masters 1 through the asynchronous communication, start the continuously receiving operation R1 in response to reception of a response signal from the one or multiple masters 1 as a reply to the transmission signal.

According to this configuration, if the slave 2 fails to receive the beacon signal Ya from the master 1 and thereby the synchronization is lost, the synchronization can be recovered with a low power consumption.

In a preferable aspect, the slave 2 may be configured to, in each of the synchronous communication and the asynchronous communication, resend the transmission signal when failing to receive the response signal from the one or multiple masters 1 as a reply to the transmission signal after sending the transmission signal to the one or multiple masters 1. An upper limit number of times of resending in terms of the asynchronous communication may be smaller than an upper limit number of times of resending in terms of the synchronous communication.

According to this configuration, the number of times of useless resending of the condition signal by the slave 2 in the asynchronous communication can be reduced, and thus the power consumption thereof can be decreased.

In a preferable aspect, the slave 2 may be configured to start the continuously receiving operation R1 when a received response signal includes information indicative of instructions to start the continuously receiving operation R1.

According to this configuration, the slave 2 can certainly start the continuously receiving operation R1 in response to reception of the response signal.

In a preferable aspect, the one or multiple masters 1 may be configured to, in sending the successive activation signals Yb in the time period Tb, add information regarding a remaining number of times of sending the successive activation signals Yb in the time period Tb, to each of the successive activation signals Yb. Additionally, the slave 2 may be configured to, when receiving one of the successive activation signal Yb via the intermittently receiving operation R2, estimate a sending timing of the beacon signal Ya from the information regarding the remaining number of times, and start the third receiving operation based on an estimated sending timing of the beacon signal Ya. Note that, the third receiving operation includes the continuously receiving operation R1 and the beacon receiving operation Ra.

According to this configuration, the slave 2 can avoid useless reception of the activation signal Yb sent repeatedly in a period from the time of receiving the activation signal Yb to the time of receiving the beacon signal Ya. Therefore, the power consumption thereof can be reduced.

In a preferable aspect, the communication system may include the multiple masters 1. The multiple masters 1 may be configured to communicate with each other and are configured to set a start timing of the time period Tb so that the time periods Tb of sending the successive activation signals Yb of the multiple masters 1 does not overlap each other.

According to this configuration, the communication system can avoid interference between the beacon signal Ya and the activation signal Yb if the multiple masters 1 are activated simultaneously.

In a preferable aspect, each of the multiple masters 1 may be configured to set a timing of sending the beacon signal Ya after sending the successive activation signals Yb in the time period Tb, in a time period other than the second time periods of the multiple masters 1 other than itself.

According to this configuration, the communication system can avoid interference between the beacon signals Ya if the multiple masters 1 are activated simultaneously.

The hot-wire sensor terminal 22 to serve as the slave 2 of any one of the above communication systems may include: a hot-wire detection circuit 222 (detection circuit), a control circuit 221, and a wireless communication circuit 223. The hot-wire detection circuit 222 may be configured to detect hot-wire to be radiated from a human body. The control circuit 221 may be configured to determine whether the human body has been detected, based on a detection result of the hot-wire detection circuit 222. The wireless communication circuit 223 may be configured to perform wireless communication with the one or multiple masters 1 of the communication system and configured to send a detection signal when the control circuit 221 determines that the human body has been detected.

According to this configuration, the hot-wire sensor terminal 22 serving as the slave of the communication system can receive the beacon signal Ya to thereby make synchronization with the master 1 irrespective of the activation order of the master 1 and the slave 2, and also can reduce a load necessary for the communication process.

In a preferable aspect, the hot-wire sensor terminal may be configured to set a time period of prohibiting the wireless communication circuit 223 from sending the detection signal after the wireless communication circuit 223 sends the detection signal through the asynchronous communication.

According to this configuration, it is possible to reduce the power consumption of the hot-wire sensor terminal 22 under a condition where there would be a high possibility that the master 1 does not send the response signal as a reply.

In a preferable aspect, the hot-wire sensor terminal 22 may include a timer 224 configured to measure holding time. The timer 224 may be configured to, when the control circuit 221 determines that the human body has been detected, start to measure the holding time. The wireless communication circuit 223 may be configured to, when the control circuit 221 determines that the human body has been detected, send information for controlling an appliance (e.g., the lighting fixture 5) to a first state (e.g., an on state), to the one or multiple masters 1 and shorten a cycle of performing reception operation based on the synchronous communication and a cycle of performing reception operation based on the asynchronous communication. The timer 224 may be configured to, when the control circuit 221 determines that the human body has been detected while the timer 224 measures the holding time, restart to measure the holding time after resetting a measured value of the holding time. The wireless communication circuit 223 may be configured to, when the timer 224 completes measuring the holding time, send information for controlling the appliance to a second state (e.g., off state). The timer 224 may be configured to, when the wireless communication circuit 223 receives, from the one or multiple masters 1, a signal indicating that the appliance has been controlled to the second state while the timer 224 measures the holding time, terminate measuring the holding time.

According to this configuration, the hot-wire sensor terminal 22 prevents the timer 224 from continuing a useless time measuring operation, and therefore the power consumption can be reduced.

The invention claimed is:

1. A communication system comprising: a slave; and one or multiple masters configured to establish wireless communication with the slave,
the one or multiple masters and the slave being configured to communicate with each other by use of a communication frame including a first time slot allowing the one or multiple masters to send a beacon signal to the slave and a second time slot allowing the slave to perform a receiving operation only,
the slave being configured to, when activated, start a first receiving operation of performing the receiving operation throughout a first time period longer than one cycle of the communication frame, the slave being configured to, when receiving the beacon signal while performing the first receiving operation, perform, by use of the communication frame, synchronous communication of making synchronization with the one or multiple masters based on a time point of receiving the beacon signal, and communicating with the one or multiple masters, the slave being configured to, when failing to receive the beacon signal while performing the first receiving operation, perform, by use of the communication frame, asynchronous communication of communicating with the one or multiple masters without making the synchronization to perform a second receiving operation using the second time slot at an intermittently receiving cycle being an integral multiple of one cycle of the communication frame,
the one or multiple masters being configured to, when activated, send successive activation signals in a second time period longer than the intermittently receiving cycle, and subsequently send the beacon signal, and
the slave being configured to, when receiving at least one of the successive activation signals while being in the second receiving operation, start a third receiving operation.

2. The communication system of claim 1, wherein
an operation time period of the third receiving operation is a time period equal to the first time period.

3. The communication system of claim 1, wherein
the slave is configured to measure a received signal intensity in a predetermined time period after start of a receiving process using the second time slot each time performing the second receiving operation, and the slave is configured to, when the received signal intensity measured is equal to or less than a threshold value, terminate the receiving process using the second time slot.

4. The communication system of claim 1, wherein
the slave is configured to correct the synchronization based on the beacon signal to be received at a predetermined cycle in performing the synchronous communication, and the slave is configured to, when failing to successively receive the beacon signal a predetermined number of times, start the first receiving operation.

5. The communication system of claim 1, wherein
the slave is configured to, after sending a transmission signal to the one or multiple masters through the asynchronous communication, start the first receiving operation in response to reception of a response signal from the one or multiple masters as a reply to the transmission signal.

6. The communication system of claim 5, wherein:
the slave is configured to, in each of the synchronous communication and the asynchronous communication, resend the transmission signal when failing to receive the response signal from the one or multiple masters as a reply to the transmission signal after sending the transmission signal to the one or multiple masters; and
an upper limit number of times of resending in terms of the asynchronous communication is smaller than an upper limit number of times of resending in terms of the synchronous communication.

7. The communication system of claim 5, wherein
the slave is configured to start the first receiving operation when a received response signal includes information indicative of instructions to start the first receiving operation.

8. The communication system of claim 1, wherein:
the one or multiple masters are configured to, in sending the successive activation signals in the second time period, add information regarding a remaining number of times of sending the successive activation signals in the second time period, to each of the successive activation signals; and
the slave is configured to, when receiving one of the successive activation signal via the second receiving operation, estimate a sending timing of the beacon signal from the information regarding the remaining number of times, and start the third receiving operation based on an estimated sending timing of the beacon signal.

9. The communication system of claim 1, comprising the multiple masters,
the multiple masters being configured to communicate with each other and being configured to set a start timing of the second time period so that the second time periods of sending the successive activation signals of the multiple masters does not overlap each other.

10. The communication system of claim 9, wherein:
each of the multiple masters is configured to set a timing of sending the beacon signal after sending the successive activation signals in the second time period, in a time period other than the second time periods of the multiple masters other than itself.

11. A hot-wire sensor terminal to serve as the slave of the communication system of claim 1, the hot-wire sensor terminal comprising:
a detection circuit configured to detect hot-wire to be radiated from a human body;
a control circuit configured to determine whether the human body has been detected, based on a detection result of the detection circuit; and
a wireless communication circuit configured to perform wireless communication with the one or multiple masters of the communication system and configured to send a detection signal when the control circuit determines that the human body has been detected.

12. The hot-wire sensor terminal of claim 11, configured to set a time period of prohibiting the wireless communication circuit from sending the detection signal after the wireless communication circuit sends the detection signal through the asynchronous communication.

13. The hot-wire sensor terminal of claim 11, further comprising a timer configured to measure holding time,
the timer being configured to, when the control circuit determines that the human body has been detected, start to measure the holding time, the wireless communication circuit being configured to, when the control circuit determines that the human body has been detected, send information for controlling an appliance to a first state, to the one or multiple masters and shorten a cycle of performing reception operation based on the synchronous communication and a cycle of performing reception operation based on the asynchronous communication,
the timer being configured to, when the control circuit determines that the human body has been detected while the timer measures the holding time, restart to measure the holding time after resetting a measured value of the holding time,
the wireless communication circuit being configured to, when the timer completes measuring the holding time, send information for controlling the appliance to a second state, and
the timer being configured to, when the wireless communication circuit receives, from the one or multiple masters, a signal indicating that the appliance has been controlled to the second state while the timer measures the holding time, terminate measuring the holding time.

* * * * *